(12) United States Patent
Pampattiwar et al.

(10) Patent No.: US 11,178,743 B2
(45) Date of Patent: Nov. 16, 2021

(54) SELF-REPAIRING LIGHTING SYSTEM AND METHOD

(71) Applicant: Grote Industries, LLC, Madison, IN (US)

(72) Inventors: Sankalp Pampattiwar, Madison, IN (US); Yogesh Kubal, Madison, IN (US); Cesar Perez-Bolivar, Madison, IN (US)

(73) Assignee: Grote Industries, LLC, Madison, IN (US)

( * ) Notice: Subject to any disclaimer, the term of this patent is extended or adjusted under 35 U.S.C. 154(b) by 0 days.

(21) Appl. No.: 16/268,689

(22) Filed: Feb. 6, 2019

(65) Prior Publication Data

US 2020/0253010 A1 Aug. 6, 2020

(51) Int. Cl.
*H05B 45/58* (2020.01)
(52) U.S. Cl.
CPC .................................. *H05B 45/58* (2020.01)
(58) Field of Classification Search
None
See application file for complete search history.

(56) References Cited

U.S. PATENT DOCUMENTS

| 9,980,342 B1* | 5/2018 | Slade ...................... H05B 45/44 |
| 2010/0219774 A1 | 9/2010 | Bianco et al. |
| 2011/0260622 A1* | 10/2011 | Hartikka ................... F21K 9/27 |
| | | 315/113 |
| 2013/0293126 A1* | 11/2013 | Chen ....................... H05B 45/35 |
| | | 315/186 |
| 2014/0265839 A1* | 9/2014 | Anand ................... H05B 45/50 |
| | | 315/77 |
| 2017/0245332 A1* | 8/2017 | Hikmet .................. H05B 45/10 |
| 2017/0303368 A1 | 10/2017 | Brebenel |

OTHER PUBLICATIONS

T. J. Donnelly and S. D. Pekarek, "Modeling and control of an LED-based airfield lighting system," 2018 IEEE Power and Energy Conference at Illinois (PECI), 2018, pp. 1-5, doi: 10.1109/PECI.2018.8334974. (Year: 2018).*
The International Search Report and The Written Opinion of the International Searching Authority dated Mar. 31, 2020 in the corresponding PCT International Patent Application No. PCT/US2019/064604.

* cited by examiner

*Primary Examiner* — Lynda Jasmin
*Assistant Examiner* — Laura Yesildag
(74) *Attorney, Agent, or Firm* — Posz Law Group, PLC

(57) ABSTRACT

A self-repairing lighting system is provided, including: a power line; a ground line; a first lighting circuit arranged between the power line and the ground line, the first lighting circuit including a plurality of first lights arranged in series; and a first switch arranged in series with the plurality of first lights; a second lighting circuit arranged between the powerline and the ground, the second lighting circuit including a plurality of second lights arranged in series; and a second switch arranged in series with the plurality of second lights; a detector configured to detect an operating parameter of the self-repairing lighting system; a controller configured to operate the first and second switches based on the operating parameter. The operating parameter is one of a voltage drop on or a current passing through the power line, the ground line, or one of the lighting circuits.

24 Claims, 12 Drawing Sheets

SELF-REPAIRING LIGHTING SYSTEM AND METHOD

TECHNICAL FIELD

The present disclosure generally relates to a lighting system including a plurality of lights. More particularly, the present disclosure relates to lighting system with at least two parallel sets of lights that can monitor a set of lights currently in use and switch to an alternate set of lights should the current set of lights fail.

BACKGROUND

In many lighting environments it is important for a set of lights to be functional for reasons of safety, compliance, or reliability. For example, in some vehicular situations (e.g., trucking, boating, or aviation) there are regulatory requirements that require that indicator lights on a vehicle operate properly. Nonfunctioning lights in such environments can lead to safety issues, monetary penalties, or even requirements that the vehicles not be used until the lights are rendered functional again.

Typically, a user will have to monitor the functionality of the lights that they use and take necessary steps when they identify a nonfunctioning light. For example, the operator of a truck may have to periodically review all the lights on their truck to determine that they are functioning properly. If they identify a nonfunctioning light, then they must take steps to repair or replace that nonfunctioning light even if it is not convenient to do so (e.g., they have a shipment that needs to go out immediately). This can cause unnecessary delays as the truck operator must immediately address the issue of the nonfunctioning light, since regulations require that all lights be operational for the truck to operate.

Furthermore, since the truck operator cannot constantly monitor the lights on their truck, there is also the possibility that a light will burn out in between times when the truck operator monitors the lights on the truck. This can result in the truck being pulled over by a police officer for operating with a nonfunctioning light, and the truck operator having to pay a fine.

Moreover, even if the truck operator avoids being caught by the authorities for driving a truck without all its lights operating properly, there remains the risk that the lack of proper lighting may cause the truck to get into an accident. This could have the undesirable effect of causing injury to person or property. In addition, the truck operator likewise runs the risk of being found at fault for such an accident because they were driving a truck without its lights functioning properly.

Similar problems can occur in other situations that always require lights to be functioning properly. For example, airplanes and boats must always have properly functioning lights. If one of the lights on a boat or airplane fails, the operator of the boat or airplane may have to pull the vehicle out of operation at an awkward time to repair or replace the nonfunctioning light. Similarly, the operator of the boat or airplane may be forced to pay a fine for improper operation if they fail to discover a nonfunctioning light, or an accident may occur because of a nonfunctioning light.

Non-vehicular lighting environments also exist that always require lights to be operating properly. For example, any situation that involves a warning light may require such warning light to always operate properly.

It would therefore be desirable to provide a system and method by which a lighting system could maintain full operating status even when a light is burned out and could warn the operator of the lighting system of the need to repair or replace a broken light.

SUMMARY

A self-repairing lighting system is provided comprising: a power line connected to a power node; a ground line connected to a ground node; a first lighting circuit arranged between the power node and the ground node, the first lighting circuit including a plurality of first light-emitting diodes arranged in series with each other; and a first switch arranged in series with the plurality of first light-emitting diodes; a second lighting circuit arranged between the power node and the ground node, the second lighting circuit including a plurality of second light-emitting diodes arranged in series with each other; and a second switch arranged in series with the plurality of second light-emitting diodes; a detector configured to detect an operating parameter of the self-repairing lighting system; a local controller configured to operate the first and second switches based on the operating parameter, wherein the operating parameter is one of a voltage drop on one of the power line, the ground line, the first lighting circuit, or the second lighting circuit, or a current passing through one of the power line, the ground line, the first lighting circuit, or the second lighting circuit.

The detector may further comprise: a sense resistor formed either on the power line between the power node and a power source or on the ground line between the ground node and a ground voltage, wherein the local controller may be further configured to determine a voltage drop across the sense resistor based on a first voltage at a first terminal of the sense resistor and a second voltage at a second terminal of the sense resistor.

The detector may further comprise: a current detector formed either on the power line between the power node and a power source or on the ground line between the ground node and a ground voltage, the current detector operative to detect a current flowing from the power source to the ground.

The self-repairing lighting system may further comprise: a third lighting circuit arranged between the power node and the ground node, the third lighting circuit including a plurality of third light-emitting diodes arranged in series with each other; and a third switch arranged in series with the plurality of third light-emitting diodes, wherein the local controller is further configured to operate the third switch based on the operating parameter.

The local controller may be further configured to close the first switch and open the second switch when the operating parameter is determined to be within an error range of values; and open the first switch and close the second switch when the operating parameter is determined to be outside of the error range of values.

The local controller may be further configured to send an error message to a remote controller when the operating parameter is determined to be outside of the error range of values.

The local controller may include a memory configured to store the detected operating parameter related to the self-repairing lighting system.

A self-repairing lighting system is provided, comprising: a power line connected to a power node; a ground line connected to a ground node; a plurality of light circuits arranged in series between the power node and the ground node, each light circuit including a first light-emitting diode and a first switch arranged in series between an input node of the light circuit and an output node of the light circuit, a second light-emitting diode and a second switch arranged in series between the input node and the output node, the second light-emitting diode and the second switch being in parallel with the first light-emitting diode and the first switch, and a voltage detector configured to detect a voltage drop across the first light-emitting diode and generate a voltage signal; and a local controller configured to operate the first and second switches in each of the light circuits based on the plurality of voltage drops in the plurality of light circuits.

The voltage detector in each light circuit may further comprise: a first voltage detector configured to detect a first voltage at a first terminal of the first light-emitting diode, and a second voltage detector configured to detect a second voltage at a second terminal of the first light-emitting diode, wherein the local controller may be further configured to determine a voltage drop across the first light-emitting diode based on the first voltage and the second voltage.

Each light circuit may further comprise a third light-emitting diode and a third switch arranged in series between the input node and the output node, the third light-emitting diode and the third switch being in parallel with both the first light-emitting diode and the first switch, and the second light-emitting diode and the second switch, and the local controller may be further configured to operate the third switch in each of the light circuits based on the plurality of voltage drops in the plurality of light circuits.

The local controller may include a memory configured to store system parameters related to the self-repairing lighting system.

The local controller may be further configured to send an error message to a remote controller when the operating parameter is determined to be outside of the error range of values.

A method of operating a self-repairing lighting system having a first set of light-emitting diodes arranged in parallel with a second set of light-emitting diodes is provided, comprising: setting a first switch to be closed such that power is provided to the first set of light-emitting diodes from a power line upon turning the self-repairing lighting system on; setting a second switch to be open such that power is not provided to the second set of light-emitting diodes from the power line upon turning the self-repairing lighting system on; measuring a first operating parameter of the self-repairing lighting system; determining whether the measured first operating parameter is within an error range of values; setting the second switch to be closed such that power is provided to the second set of light-emitting diodes from the power line when the measured first operating parameter is determined to be outside of the error range of values; and setting the first switch to be open such that power is not provided to the first set of light-emitting diodes from the power line when the measured first operating parameter is determined to be outside of the error range of values, wherein the first operating parameter may be one of a voltage drop over at least a portion of the power line, the ground line, the first lighting circuit, or the second lighting circuit, or a current passing through one of the power line, the ground line, the first lighting circuit, or the second lighting circuit.

The method may further comprise: sending an error message to a remote controller when the first operating parameter is determined to be outside of the error range of values.

The method may further comprise: defining the error range of values as a base range of values upon turning the self-repairing lighting system on; determining a revised range of values based on the error range of values and the measured operating parameter; setting the error range of values to be equal to the revised range of values; and repeating the operations of determining a revised range of values and setting the error range of values to be equal to the revised range of values each time the operating parameter is measured.

The method may further comprise: storing a plurality of measured operating parameters over time, and determining the revised range of values based on the error range of values and the plurality of measured operating parameters.

The operation of measuring the first operating parameter may be repeated.

The method may further comprise: determining whether the measured operating parameter is within a maintenance range of values, the maintenance range of values being within the error range of values; and sending a maintenance message to a remote controller when the operating parameter is determined to be outside of the maintenance range of values but within the error range of values.

The method may further comprise: measuring second through $N^{th}$ operating parameters of the self-repairing lighting system, the first though $N^{th}$ operating parameters being voltage drops over first though $N^{th}$ light-emitting diodes, respectively, in the first lighting circuit; determining whether the any of the measured first through $N^{th}$ operating parameters are within an error range of values; setting the second switch to be closed such that power is provided to the second set of light-emitting diodes from the power line when any of the measured first though $N^{th}$ operating parameters are determined to be outside of the error range of values; and setting the first switch to be open such that power is not provided to the first set of light-emitting diodes from the power line when any of the measured first though Nth operating parameters though $N^{th}$ determined to be outside of the error range of values, wherein N is an integer greater than 1.

A method of operating a self-repairing lighting system having first through $N^{th}$ sets of light-emitting diodes, each arranged in parallel, is provided comprising: setting a first switch to be closed such that power is provided to the first set of light-emitting diodes from a power line upon turning the self-repairing lighting system on; setting second through $N^{th}$ switches to be open such that power is not provided to the second through $N^{th}$ sets of light-emitting diodes from the power line upon turning the self-repairing lighting system on; setting a lighting counter J equal to 1; measuring an operating parameter of the self-repairing lighting system; determining whether the measured operating parameter is within an error range of values; incrementing the lighting counter J if the measured operating parameter is outside the error range of values; setting the $J^{th}$ switch to be closed such that power is provided to the second set of light-emitting diodes from the power line when the measured operating parameter is determined to be outside of the error range of values; and setting the first through $(J-1)^{th}$ switches and the $(J+1)^{th}$ to $N^{th}$ switches to be open such that power is not provided to the first through $(J-1)^{th}$ sets of light-emitting diodes and the $(J+1)^{th}$ to $N^{th}$ sets of light-emitting diodes from the power line when the measured operating parameter is determined to be outside of the error range of values, wherein N is an integer greater than 2, the operating parameter is one of a voltage drop over at least a portion of the power line, the ground line, the first lighting circuit, or the second lighting circuit, or a current passing through one of the power line, the ground line, the first lighting circuit, or the second lighting circuit, and the operations of measuring an operating parameter, determining whether the measured operating parameter is within an error range of values, incrementing the lighting counter J if the measured operating parameter is outside the error range of values, setting the $J^{th}$ switch to be closed when the measured operating parameter is determined to be outside of the error range of values, and setting the first through $(J-1)^{th}$ switches and the $(J+1)^{th}$ to $N^{th}$ switches to be open when the measured operating parameter is determined to be outside of the error range of values are repeated throughout operation of a lighting system.

The method may further comprise: sending a maintenance warning message to a remote controller when it is determined that the measured operating parameter is outside the error range of values, and (J<N).

The method may further comprise: sending an error message to a remote controller when it is determined that the measured operating parameter is outside the error range of values, and (J=N).

The method may further comprise: defining the error range of values as a base range of values upon turning the self-repairing lighting system on; determining a revised range of values based on the error range of values and the measured operating parameter; setting the error range of values to be equal to the revised range of values; and repeating the operations of determining a revised range of values and setting the error range of values to be equal to the revised range of values each time the operating parameter is measured.

The method may further comprise: storing a plurality of measured operating parameters over time; and determining the revised range of values based on the error range of values and the plurality of measured operating parameters.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention. These drawings are not necessarily drawn to scale.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order (i.e., processes or steps that are not so limited may be performed in any order).

Furthermore, elements having the same number represent the same element across the various figures, and throughout the disclosure. Their description is not always repeated for each embodiment but may be inferred from previous descriptions. Elements that have the same number but have the addition of a letter designator indicate distinct embodiments of a more generic element.

Self-Repairing Lighting System—First Disclosed Embodiment

Figure 1:
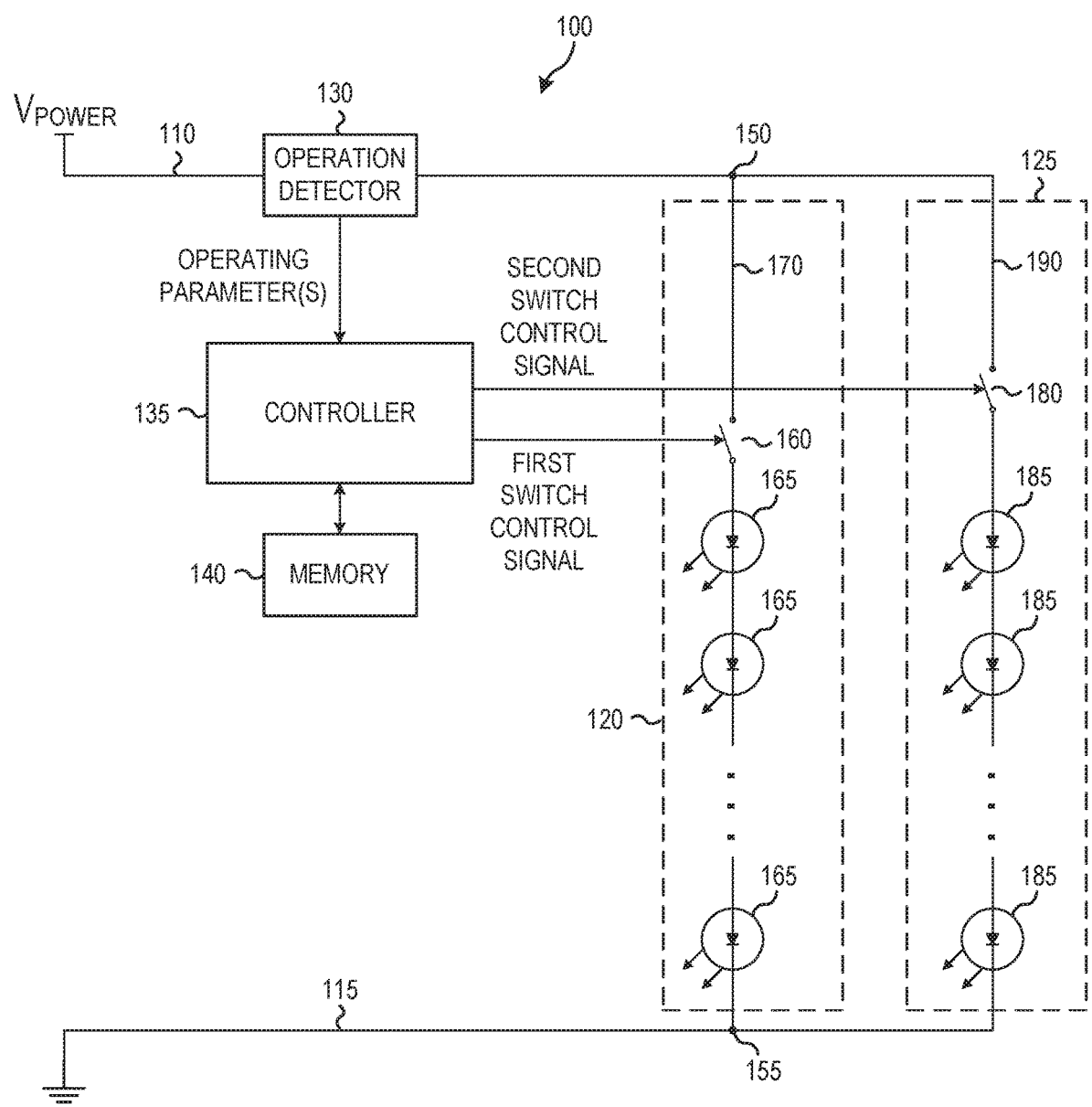
FIG. 1 is a block diagram of a self-repairing lighting system according to disclosed embodiments.

FIG. 1 is a block diagram of a self-repairing lighting system 100 according to disclosed embodiments. As shown in FIG. 1, the self-repairing lighting system 100 includes a power line 110, a ground line 115, a first lighting circuit 120, a second lighting circuit 125, an operation detector 130, a controller 135, and a memory 140. The first lighting circuit 120 is formed of a first switch 160 and a plurality of first lights 165. The second lighting circuit 125 is formed of a second switch 180 and a plurality of second lights 185.

The power line 110 is located between a power source and a power node 150 and serves to provide power to the first and second lighting circuits 120, 125.

The ground line 115 is located between ground and a ground node 155 and serves as a ground for the first and second lighting circuits 120, 125.

The first lighting circuit 120 is formed on a first conductive line 170 between the power node 150 and the ground node 155. It is formed of the first switch 160 and the plurality of first lights 165 arranged in series.

The first switch 160 is located on the first conductive line 170 and controls current passing through the first conductive line 170 to the first lights 165 located on the first conductive line 170. When the first switch 160 is open, current cannot pass through the first conductive line 170, and so the first lights 165 will not receive power. When the first switch 160 is closed, current will pass through the first conductive line 170 and the first lights 165 from the power line 110 to the ground line 115.

In one disclosed embodiment, the first switch 160 can be a single pole single throw (SPST) switch. Alternate embodiments can employ different switch types for the first switch 160 as needed.

The plurality of first lights 165 are a series of individual lighting elements connected in series between the power node 150 and the ground node 155. In one embodiment, the first lights 165 are light-emitting diodes. However, alternate embodiments can employ different types of first lights 165.

The second lighting circuit 125 is formed on a second conductive line 190 between the power node 150 and the ground node 155. It is formed of a second switch 180 and a plurality of second lights 185 arranged in series.

The second switch 180 is located on the second conductive line 190 and controls current passing through the first conductive line 180 to the second lights 185 located on the second conductive line 190. When the second switch 180 is open, current cannot pass through the second conductive line 190, and so the second lights 185 will not receive power. When the second switch 180 is closed, current will pass through the second conductive line 190 and the second lights 185 from the power line 110 to the ground line 115.

In one disclosed embodiment, the second switch 180 can be a single pole single throw (SPST) switch. Alternate embodiments can employ different switch types for the second switch 180 as needed.

The plurality of second lights 185 are a series of individual lighting elements connected in series between the power node 150 and the ground node 155. In one embodiment, the first lights 185 are light-emitting diodes. However, alternate embodiments can employ different types of second lights 185.

The operation detector 130 is connected to or on the power line 110 and operates to detect one or more operating parameters for the system 100 that relate to the operation of the first or second lighting circuits 120, 125. In various embodiments these one or more operating parameters can be a voltage drop across a resistor formed on the power line 110, a current passing through the power line 110, or any system parameter that relates to the operation of the first or second lighting circuits 120, 125. The operation detector 130 provides the one or more operating parameters to the controller 135.

In various embodiments, the one or more operating parameters detected by the operation detector could be a direct measurement of a particular aspect of operation (e.g., a voltage drop across a reference resistor or a current passing through the power line 110) or they could be an indirect measurement of a particular aspect of operation (e.g., a first voltage at a first end of a reference resistor and a second voltage at a second end of the reference resistor). For ease of disclosure, the one or more operating parameters may occasionally be referred to as simply an operating parameter. It should be understood that this can refer to one or more operating parameters.

Although the operation detector 130 is disclosed in this embodiment as being located on the power line 110, it could also be located on the ground line 115 in an alternate embodiment. Some embodiments could even provide separate operation detectors on each of the first and second conductive lines 170, 190, and instruct the controller 135 to monitor an operating parameter on the conductive line 170, 190 associated with a selected lighting circuit 120, 125.

The controller 135 provides a first switch control signal to control the operation of the first switch 160 and provides a second switch control signal to control the operation of the second switch 180.

The controller 135 receives the one or more detected operating parameters from the operation detector 130 and uses them to determine whether a selected one of the first or second lighting circuits 120, 125 is operating properly, is in need of maintenance, or has failed to operate properly. Based on this determination, the controller 135 generates the first and second switch control signals to control the first and second switches 160, 180 to select either the first lighting circuit 120 or to select the second lighting circuit 125. According to the disclosed embodiment, the controller 135 maintains one of the first and second switches 160, 180 in an open position, and the other of the first and second switches 160, 180 in a closed position. In this way, only one of the first and second lighting circuits 120, 125 will be active at any given time.

Specifically, if the controller 135 selects the first lighting circuit 120, it generates a first switch control signal that instructs the first switch 160 to be closed and generates a second switch control signal that instructs the second switch 180 to be opened. This allows power to flow from the power line 110 through the first lighting circuit 120 to the ground line 115 but prevents power from flowing from the power line 110 through the second lighting circuit 125 to the ground line 115.

Similarly, if the controller 135 selects the second lighting circuit 125, it generates a first switch control signal that instructs the first switch 160 to be open and generates a second switch control signal that instructs the second switch 180 to be closed. This allows power to flow from the power line 110 through the second lighting circuit 125 to the ground line 110 but prevents power from flowing from the power line 110 through the first lighting circuit 120 to the ground line 115.

After receiving the detected one or more operating parameters, the controller 135 compares the detected operating parameters with reference operating parameters stored in the memory 140. In making this comparison, the controller 135 can either directly compare the detected one or more operating parameters with stored reference operating parameters or may manipulate the detected one or more operating parameters to place them in a more convenient format.

For example, in one embodiment the detector 130 could provide a direct value for a voltage drop across a reference resistor in the power line 110. In this case, the controller 135 compares this direct value for the voltage drop with a reference value for an expected voltage drop. In another embodiment, the detector 130 could provide values for a first voltage at a first end of the reference resistor and a second voltage at a second end of the reference resistor. In this case, the controller 135 could first subtract the second voltage from the first voltage to obtain a value for a voltage drop across the reference resistor, and then compare that determined voltage drop with a reference value for the voltage drop.

The controller 135 determines whether the detected one or more operating parameters are within a set range (i.e., tolerance) of the stored reference operating parameters. This set range can be an error range that indicates whether or not a lighting circuit 120, 125 is functional, or it could be a maintenance range that indicates whether or not a lighting circuit 120, 125 requires maintenance. Generally, the maintenance range will be smaller than the error range, such that a detected operating parameter could have three possible positions: (1) inside both the maintenance range and the error range (indicating that the lighting circuit 120, 125 is operating properly), (2) outside the maintenance range but inside the error range (indicating that the lighting circuit 120, 125 is still functional, but requires maintenance), or (3) outside both the maintenance range and the error range (indicating that the lighting circuit 120, 125 is not completely functional).

The controller 135 is configured to control the operation of the first and second switches 160, 180 based on the result of the comparison of the detected one or more operating parameters with the stored reference operating parameters as will be shown below. Specifically, the controller 135 is configured to determine whether the one or more operating parameters are either outside of the maintenance range, or are outside the error range, as an indication of whether a selected one of the first or second lighting circuits 120, 125 are functional, in need of maintenance, or broken.

The controller 135 is configured to either close the first switch 160 and open the second switch 180 to allow the first lighting circuit 120 to receive power while preventing the second lighting circuit 125 from receiving power, or to close the second switch 180 and open the first switch 160 to allow the second lighting circuit 125 to receive power while preventing the first lighting circuit 120 from receiving power.

The controller 135 is also configured to update the reference operating parameters over time to account for natural shifts in the operating parameters. For example, if the operation detector 130 detects a voltage across a reference resistor, it would be expected that over time an expected value of that voltage might change slightly as the selected lighting circuit 120, 125 ages. Therefore, in order to maintain an accurate value for the stored reference operating parameter, it would be desirable to update the stored reference operating parameter. One way to do this is to continuously update the stored reference operating parameter based on a time window of previous detected values. For example, the controller 135 might update the reference operating parameter based on a number of previous detected values (e.g., 20-100) by averaging them, performing a weighted average function on these values, or any other desirable function. These previous detected values can be stored in the memory 140 or in a volatile memory in the controller 135.

When there are no previous detected values (e.g., when the lighting system is first operated), the controller 135 can be aware of a default value for the operating parameter, or the memory 140 can contain such a default value.

In some embodiments, the lighting system can be operated for a short time before the controller 135 makes any decisions regarding the operating status of a given lighting circuit 120, 125 to provide enough samples of the detected one or more operating parameters for the controller 135 to calculate a proper value to store for the reference operating parameters.

In addition, although the above description refers to the use of both a maintenance range and error range, alternate embodiments could employ only a single error range.

The controller 135 can be a microprocessor, an ASIC, or any suitable circuitry for manipulating the detected one or more operating parameters, accessing stored reference operating parameters from the memory 140, comparing the detected one or more operating parameters with the stored reference operating parameters, and controlling the first and second switches 160, 180.

The memory 140 is a non-volatile memory that stores information used by the controller 135. In various embodiments the memory 140 can be a hard disk drive, a solid-state drive, a flash memory, an EEPROM, or any suitable non-volatile memory.

The Operation Detector

Figure 2A:
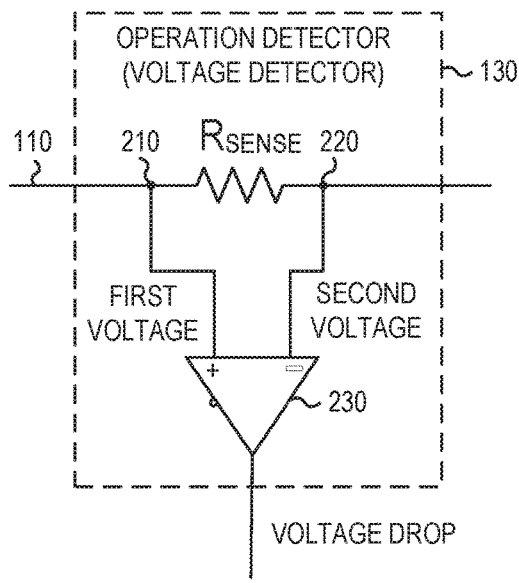
FIGS. 2A and 2B are block diagrams of the operation detector of the self-repairing lighting system of FIG. 1 when it is a voltage detector according to disclosed embodiments.
Figure 2B:
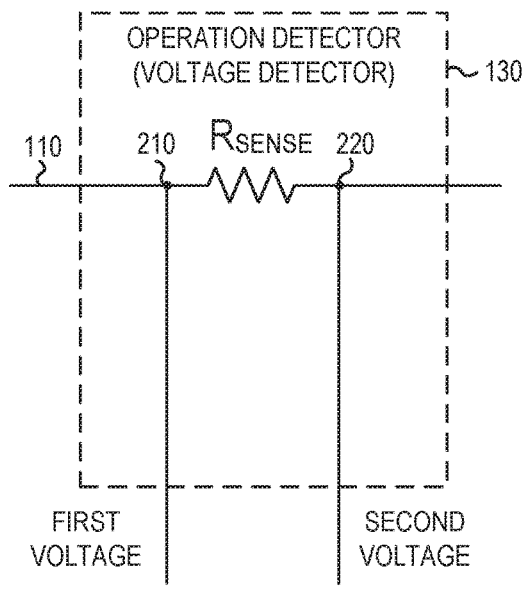

FIGS. 2A and 2B are block diagram of the operation detector 130 of the self-repairing lighting system 100 of FIG. 1 when it is a voltage detector according to disclosed embodiments.

As shown in FIG. 2A, one embodiment of a voltage-detecting operation detector 130 includes a sensing resistor $R_{SENSE}$ and a subtractor 230.

The sensing resistor $R_{SENSE}$ is located on the power line 110. First and second voltage taps 210, 220 are provided at first and second terminals of the sensing resistor $R_{SENSE}$ to provide first and second voltages, respectively. The difference between the first and second voltages represents a voltage drop across the sensing resistor $R_{SENSE}$.

The subtractor 230 receives the first and second voltages, subtracts the second voltage from the first voltage, and generates a voltage drop signal indicative of the voltage drop across the sensing resistor $R_{SENSE}$ as a detected operating parameter.

As shown in FIG. 2B, another embodiment of a voltage-detecting operation detector 130 includes only the sensing resistor $R_{SENSE}$.

As with the embodiment of FIG. 2A, the sensing resistor $R_{SENSE}$ in the embodiment of FIG. 2B is located on the power line 110. Again, first and second voltage taps 210, 220 are provided at first and second terminals of the sensing resistor $R_{SENSE}$ to provide first and second voltages, respectively. However, in this embodiment the first and second voltages are provided directly as detected operating parameters. The controller 135 receives the first and second voltages and performs the necessary subtraction to generate the voltage drop value.

Figure 3:
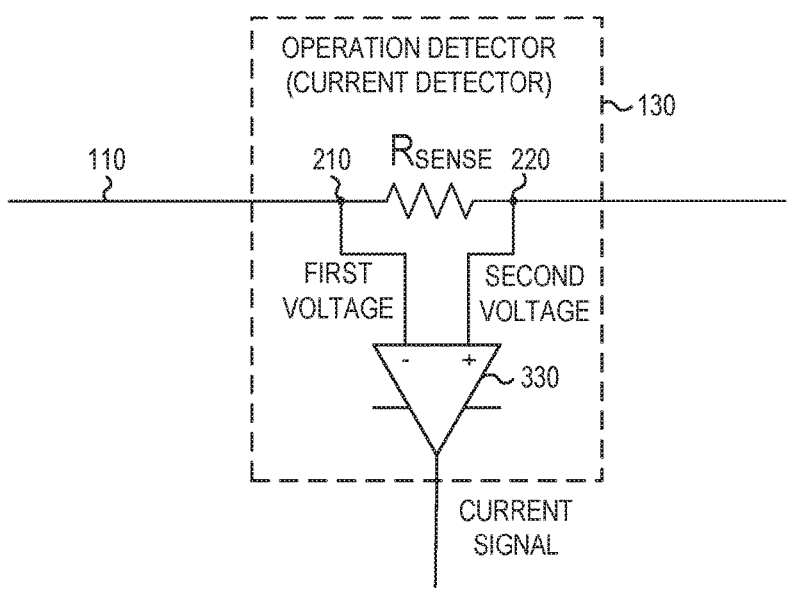
FIG. 3 is a block diagram of the operation detector of the self-repairing lighting system of FIG. 1 when it is a current detector according to disclosed embodiments.

FIG. 3 is a block diagram of the operation detector 130 of the self-repairing lighting system 100 of FIG. 1 when it is a current detector according to disclosed embodiments.

As shown in FIG. 3, a current-detecting operation detector 130 includes a sensing resistor $R_{SENSE}$ and a current-calculating circuit 330.

The sensing resistor $R_{SENSE}$ is located on the power line 110. First and second voltage taps 210, 220 are provided at first and second terminals of the sensing resistor $R_{SENSE}$ to provide first and second voltages, respectively. The difference between the first and second voltages represents a voltage drop across the sensing resistor $R_{SENSE}$.

The current-calculating circuit 330 receives the first and second voltages, subtracts the second voltage from the first voltage to generates a voltage drop value indicative of the voltage drop across the sensing resistor $R_{SENSE}$. The current-calculating circuit 330 then divides the current drop value by the resistance value of the sensing resistor $R_{SENSE}$ to determine the current passing through the sensing resistor $R_{SENSE}$, and therefore through the power line 110. The current-calculating circuit 330 then provides this calculated current has a current signal that serves as the operating parameter.

Alternate embodiments could have a operation detector operating as a current detector simply provide first and second voltages to the controller 135, as shown in FIG. 2B, allowing the controller 135 to perform the necessary calculations to generate a detected current as an operating parameter.

FIGS. 2A, 2B, and 3 are provided by way of example only. Other types of operation detectors 130 can be provided that measure other operating parameters of the signal passing through the power line 110. Any operating parameter that will vary when a light 165, 185 in a corresponding lighting circuit 120, 125 becomes in need of maintenance or nonfunctional can be used.

Self-Repairing Lighting System—Second Disclosed Embodiment

Figure 4:
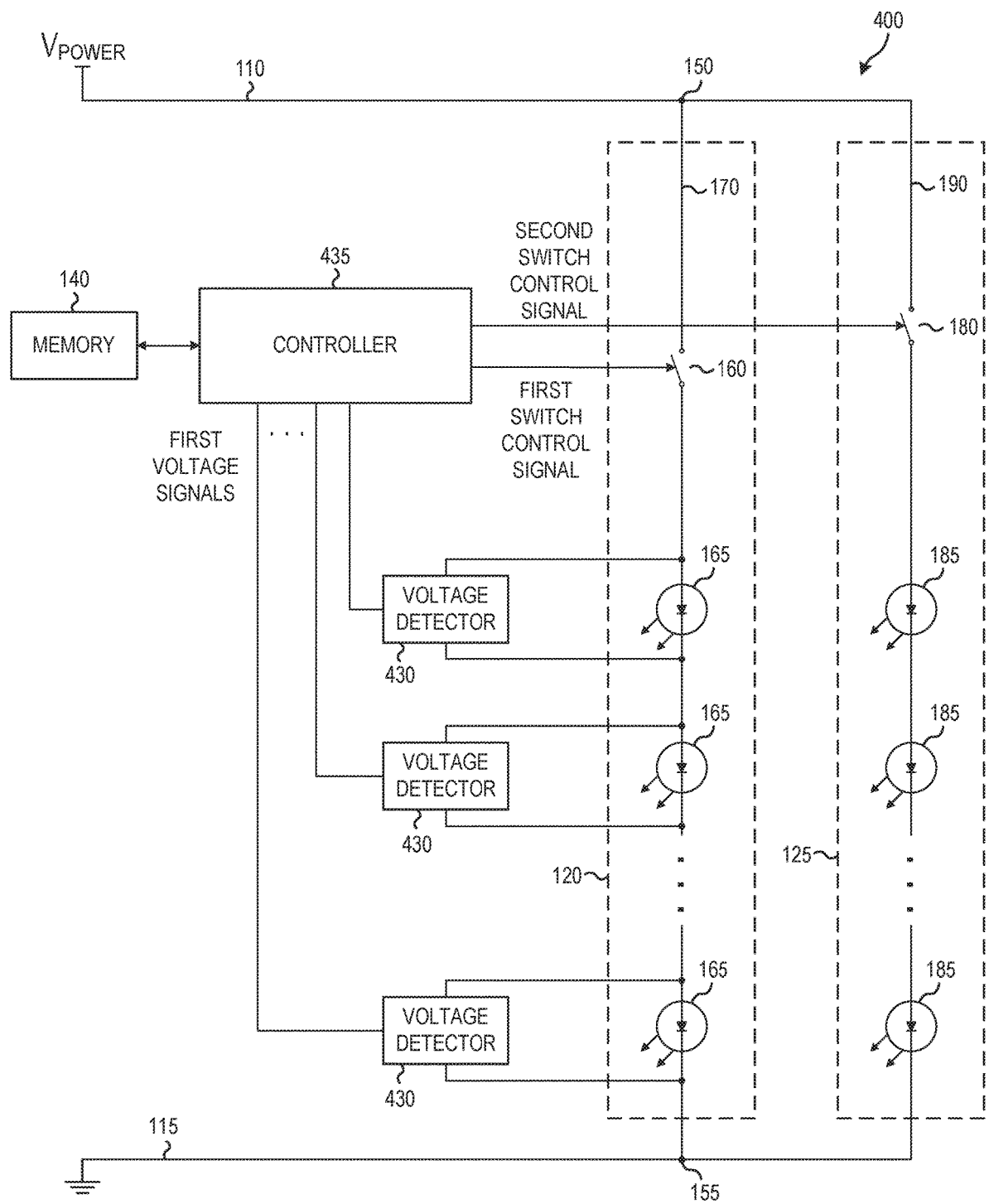
FIG. 4 is a block diagram of a self-repairing lighting system having individual voltage detectors for each light in an array according to disclosed embodiments.

FIG. 4 is a block diagram of a self-repairing lighting system 400 having individual voltage detectors for each light in a lighting circuit according to disclosed embodiments.

As shown in FIG. 4, the self-repairing lighting system 400 includes a power line 110, a ground line 115, a first lighting circuit 120, a second lighting circuit 125, a plurality of voltage detectors 430, a controller 435, and a memory 140. The first lighting circuit 120 is formed of a first switch 160 and a plurality of first lights 165. The second lighting circuit 125 is formed of a second switch 180 and a plurality of second lights 185.

Elements with similar numbers operated as described above with respect to the self-repairing lighting system 100 of FIG. 1. A description of these elements will not be repeated below.

The plurality of voltage detectors 430 are each connected to first and second terminals of respective first lights 165. Each voltage detector 430 detects a voltage drop across a corresponding first light 165 and provides that detected voltage drop as a first voltage signal to the controller 435. Each detected voltage drop can serve as a detected operating parameter.

The plurality of voltage detectors 430 can be configured in a manner similar to the voltage-detecting operation detector 130 of FIGS. 2A and 2B with the first light 165 taking the place of the sense resistor $R_{SENSE}$. Thus, although FIG. 4 discloses the use of a circuit that subtracts a first voltage at a first terminal of a first light 165 from a second voltage at a second terminal of the first light 165 to generate a first voltage signal indicative of the voltage drop across the first light 165, this is by way of example only. Alternate embodiments could provide the first and second voltages from the first and second terminals of the first light 165 directly to the controller 435, which can perform the necessary subtraction internally to generate a corresponding voltage drop across the corresponding first light 165.

The controller 435 determines whether any of the detected plurality of first voltage signals (i.e., voltage drops) are within a set error range (i.e., tolerance) of corresponding stored reference voltages. This error range indicates whether or not a first light 165 is functional. This embodiment allows for two possible positions: (1) inside the error range (indicating that the first light 165 is operating properly), or (2) outside the error range (indicating that the light 165 is not functional).

The controller 435 is configured to control the operation of the first and second switches 160, 180 based on the result of the comparisons of the detected first voltages with the corresponding stored reference voltages. The controller 435 is configured to determine whether one or more of the first lights 165 in the first lighting circuit 120 are nonfunctional, and switch to the second lighting circuit 125 at that point. For example, the controller 435 could be configured to switch from the first lighting circuit 120 to the second lighting circuit 125 when a single first light 165 was determined to be nonfunctional. In the alternative, the controller 435 could have a set number of nonfunctional lights (e.g., 5, 10, etc.) that would trigger a switch from the first lighting circuit 120 to the second lighting circuit 125.

The controller 435 is configured to either close the first switch 160 and open the second switch 180 to allow the first lighting circuit 120 to receive power while preventing the second lighting circuit 125 from receiving power, or to close the second switch 180 and open the first switch 160 to allow the second lighting circuit 125 to receive power while preventing the first lighting circuit 120 from receiving power.

The controller 435 is also configured to update the first reference voltages over time to account for natural shifts in the measured voltages across the first lights 165. For example, it would be expected that over time an expected value of across each first light 165 the voltage might change slightly as the lighting circuit 120 ages. Therefore, to maintain an accurate value for the stored reference voltages, it would be desirable to update the stored reference voltages. One way to do this is to continuously update the stored reference voltages based on a time window of previous detected values. For example, the controller 435 might update the reference voltages based on a number of previous detected values (e.g., 20-100) by averaging them, performing a weighted average function on these values, or any other desirable function. These previous detected reference voltage values for each first light 165 can be stored in the memory 140 or in a volatile memory in the controller 435.

When there are no previous detected values (e.g., when the lighting system 400 is first operated), the controller 435 can be aware of a default value for the operating parameter, or the memory 140 can contain such a default value.

In some embodiments, the lighting system 400 can be operated for a short time before the controller 435 makes any decisions regarding the operating status of the first lights 165 in the first lighting circuit 120 to provide enough samples of the detected first voltages for the controller 435 to calculate a proper value to store for the reference voltages.

The controller 435 can be a microprocessor, an ASIC, or any suitable circuitry for manipulating the detected first voltages, accessing stored reference voltages from the memory 140, comparing the detected first voltages with the stored reference voltages, and controlling the first and second switches 160, 180.

The embodiment of FIG. 4 is configured to only detect errors in the first lighting circuit 120 and so only includes voltage detectors 430 connected to the first lights 165 in the first lighting circuit 120. If an error occurs in one or more of the first lights 165 in the first lighting circuit 120, the controller 435 will set first and second switches 160, 180 to deselect the first lighting circuit 120 and to select the second lighting circuit 125. Since the first lighting circuit 120 will be nonfunctional once it is deselected, it may not be necessary to monitor the operation of the second lighting circuit 125.

However, in alternate embodiments, voltage detectors 430 can be provided for each of the second lights 185 as well in a manner similar to the way the voltage detectors 430 are provided for each of the first lights 165. These voltage detectors 430 for the second lights 185 can provide second voltage signals to the controller 435 in a manner similar to the way the first voltage signals are provided by the voltage detectors 430 connected to the first lights 165.

The controller 435 can use these second error signals to determine whether any second lights 185 in the second lighting circuit 125 have failed and can take whatever action is necessary. This action can include sending an error message, or altering the first and second switches 160, 180 to again select the first lighting circuit 120. In operation, the controller 435 can take into account the number of nonfunctional lights in each lighting circuit 120, 125, and select the lighting circuit with the fewest nonfunctioning lights.

Similarly, in alternate embodiments the controller 435 can use both a maintenance range and an error range for each voltage comparison. In this way the controller 435 can determine whether any of the detected plurality of first voltage signals are within either an error range that indicates whether or not a light 165 is functional, or a maintenance range that indicates whether or not a first light 165 requires maintenance. As with the first disclosed embodiment, the maintenance range will be smaller than the error range, such that a detected operating parameter could have three possible positions: (1) inside both the maintenance range and the error range (indicating that the first light 165 is operating properly), (2) outside the maintenance range but inside the error range (indicating that the first light 165 is still functional, but requires maintenance), or (3) outside both the maintenance range and the error range (indicating that the first light 165 is not functional). A similar process could be used to determine the status of the second lights 185 in the second lighting circuit 125.

In this alternate embodiment, the controller 435 could switch between the first and second lighting circuits 120, 125 as needed. For example, the controller 435 could control the first and second switches 160, 180 to move from activating the first lighting circuit 120 and deactivating the second lighting circuit 125 to activating the second lighting circuit 125 and deactivating the first lighting circuit 120 when it determined that a single first light 165 became in need of maintenance or nonfunctional in the first lighting circuit 120. Then, the controller 435 could control the first and second switches 160, 180 to move back from the second lighting circuit 125 to the first lighting circuit 120 when it determined that two second lights 185 became in need of maintenance or nonfunctional. This process could be repeated in such a way as to have the controller 435 a lighting circuit 120, 125 that it considered most functional as between the two.

The controller 435 could have a set of parameters that would allow it to select one of the first and second lighting circuits 120, 125 that was considered to be most functional based on the voltage comparisons between the first and second voltage signals.

Self-Repairing Lighting System—Third Disclosed Embodiment

Figure 5:
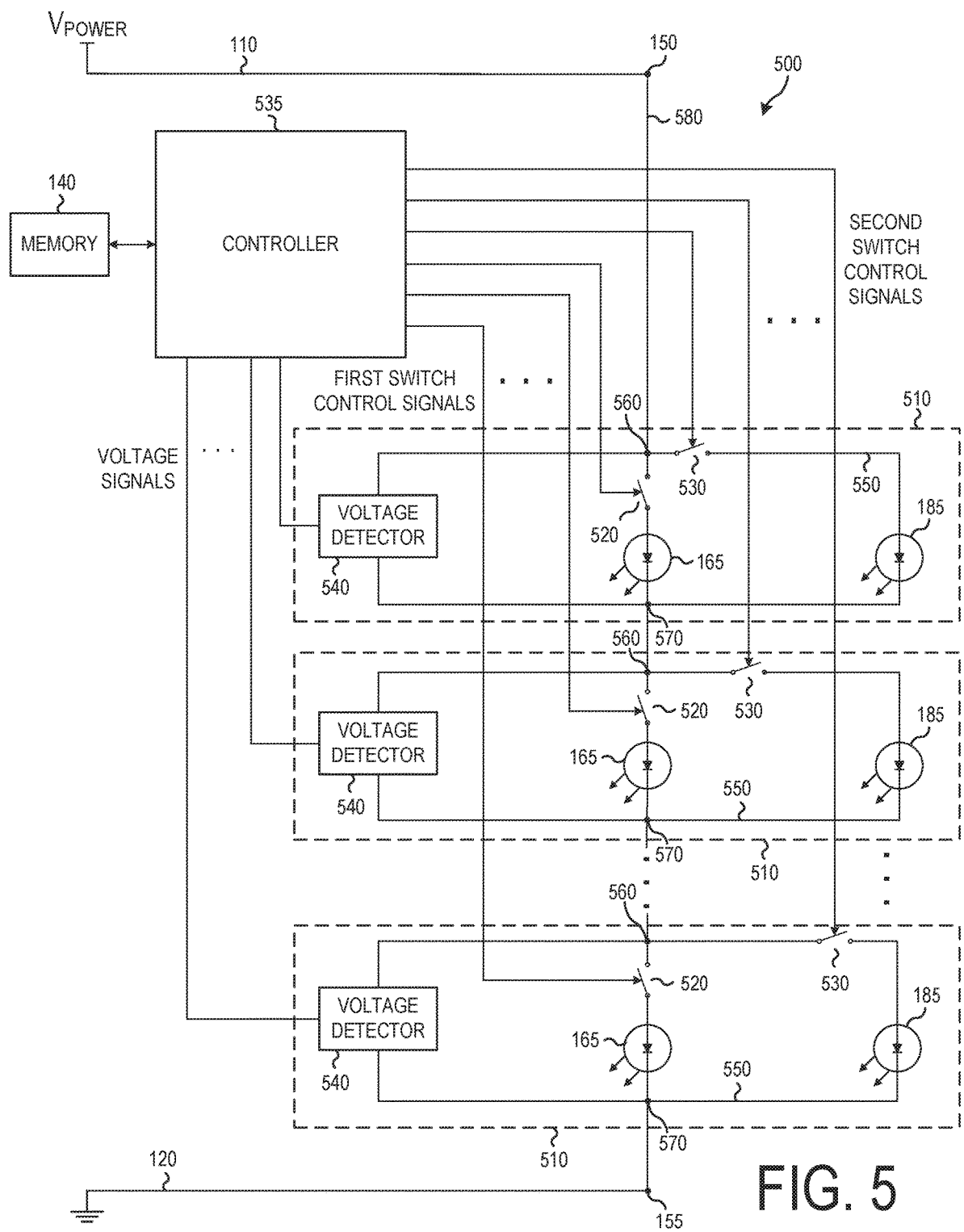
FIG. 5 is a block diagram of a self-repairing lighting system having individually controllable sets of parallel lights according to disclosed embodiments.

FIG. 5 is a block diagram of a self-repairing lighting system 500 having individually controllable sets of parallel lights according to disclosed embodiments. As shown in FIG. 5, the self-repairing lighting system 500 includes a power line 110, a ground line 115, a plurality of parallel light circuit 510 arranged in series on a main conductive line 580, a controller 535, and a memory 140. Each of the parallel light circuits 510 includes a first light 165, a second light 185, a first switch 520, a second switch 530, and a voltage detector 540.

Elements with similar numbers operated as described above with respect to the self-repairing lighting system 100 of FIG. 1. A description of these elements will not be repeated below.

The parallel light circuits 510 are arranged in series along a main conductive line 570 arranged between the power node 150 and the ground node 155.

The first switch 520 in each parallel light circuit 510 is arranged in series with a corresponding first light 165 on the main conductive line 580 between a first node 560 and a second node 570. The first switch 520 controls current passing through the main conductive line 570 between the first node 560 and the second node 570.

The second switch 530 in each parallel light circuit 510 is arranged in series with a corresponding second light 185 on a secondary conductive line 550 between the first node 560 and the second node 570. The second switch 530 controls current passing through the secondary conductive line 550 between the first node 560 and the second node 570.

In one disclosed embodiment, the first and second switches 520, 530 can be single pole single throw (SPST) switches. Alternate embodiments can employ different switch types for the first and second switches 520, 530 as needed.

The series connection of the first switch 520 and the first light 165 on the main conductive line 580 is connected in parallel with the series connection of the second switch 530 and the second light 185 on the secondary conductive line 556 between the first node 560 and the second node 570.

In each parallel light circuit 510, when the first switch 520 is open, current cannot pass through the main conductive line 580 from the first node 560 to the second node 570, and so the corresponding first light 165 will not receive power. When the first switch 520 is closed, current can pass through the main conductive line 580 from the first node 560 to the second node 570 allowing the first light 165 to receive power.

Similarly, in each parallel light circuit 510, when the second switch 530 is open, current cannot pass through the secondary conductive line 550 from the first node 560 to the second node 570, and so the corresponding second light 185 will not receive power. When the second switch 530 is closed, current can pass through the secondary conductive line 550 from the first node 560 to the second node 570 allowing the second light 185 to receive power.

Each voltage detector 540 operates to detect a voltage drop between the first node 560 and the second node 570 in a corresponding one of the parallel light circuits 510. This voltage drop will be either the voltage drop across the first light 165 or the second light 185, depending upon how the first and second switches 520, 530 are arranged.

The voltage detector is 540 operate in a manner similar to the voltage detectors 430 in the second disclosed embodiment. In other words, they can operate to directly determine the voltage drop between the first node 560 and the second node 570 by subtracting a measured voltage at the second node 570 from a measured voltage at the first node. In this way the voltage detectors 540 can provide a direct voltage signal to the controller 535 from each parallel light circuit 510 as an operating parameter. In the alternative, for each parallel light circuit 510 the voltage detector can simply measure a first voltage at the first node 560 and a second voltage at the second node 570 and provide those first and second voltages as first and second voltage signals to the controller 535 as operating parameters. In such an embodiment, the controller 535 can perform the necessary operations to determine the voltage drop between the first node 560 and the second node 570 for each of the parallel light circuits 510.

The controller 535 provides first switch control signals to control the operation of each of the first switches 520 and provides second switch control signals to control the operation of each of the second switches 530.

The controller 535 receives the voltage signals from the voltage detectors 540 in each of the parallel light circuits 510 and uses them to determine whether a selected light 165, 185 in each of the parallel light circuits 510 is operating properly, is in need of maintenance, or has failed to operate properly. Based on this determination, the controller 535 generates corresponding first and second switch control signals to control the first and second switches 520, 530 to select either the first light 165 or to select the second light 185 in the corresponding parallel light circuit 510.

According to the disclosed embodiment the controller 535 maintains one of the first and second switches 520, 530 in each parallel light circuit 510 in an open position, and the other of the first and second switches 520, 530 in each parallel light circuit 510 in a closed position. In this way, only one of the first and second lights 165, 185 will be active at any given time for each parallel light circuit 510.

Specifically, if the controller 535 selects the first light 165 in a given parallel light circuit 510, it generates an appropriate first switch control signal that instructs a corresponding first switch 520 to be closed and generates an appropriate second switch control signal that instructs the corresponding second switch 530 to be opened. This allows power to flow from the first node 560 through the first light 165 to the second node 570 along the main conductive line 580 but prevents power from flowing from the first node 560 through the second light 185 along the secondary conductive line 550 to the second node 570.

Similarly, if the controller 535 selects the second light 185 in a given parallel light circuit 510, it generates an appropriate first switch control signal that instructs a corresponding first switch 520 to be opened and generates an appropriate second switch control signal that instructs the corresponding second switch 530 to be closed. This allows power to flow from the first node 560 through the second light 185 to the second node 570 along the secondary conductive line 550 but prevents power from flowing from the first node 560 through the first light 165 along the main conductive line 580 to the second node 570.

After receiving the detected one or more voltage signals, the controller 535 compares the detected voltage drops across the first and second nodes 560, 570 in each of the parallel light circuits 510 with reference voltages stored in the memory 140. In making this comparison, the controller 535 can either directly compare the detected one or more voltage drops with stored reference voltages or may manipulate the detected voltage signals to place them in a more convenient format for comparison.

For example, if each voltage detector 540 provides a direct value for a voltage drop between the corresponding first node 560 and second node 570, the controller 535 compares this direct value for the voltage drop with a reference value for an expected voltage drop. However, if each voltage detector 540 provides values for each parallel light circuit 510 of a first voltage at a first node 560 and a second voltage at a second node 570, the controller 535 could first subtract the second voltage from the first voltage to obtain a value for a voltage drop between the corresponding first node 560 and second node 570, and then compare that determined voltage drop with a reference value for the voltage drop.

The controller 535 determines whether the detected voltage drop for each parallel light circuit 510 is within a set range (i.e., tolerance) of the stored reference voltage drop. This set range can be an error range that indicates whether or not a light 165, 185 is functional, or it could be a maintenance range that indicates whether or not a light 165, 185 requires maintenance. Generally, the maintenance range will be smaller than the error range, such that a detected operating parameter could have three possible positions: (1) inside both the maintenance range and the error range (indicating that the light 165, 185 is operating properly), (2) outside the maintenance range but inside the error range (indicating that the light 165, 185 is still functional, but requires maintenance), or (3) outside both the maintenance range and the error range (indicating that the light 165, 185 is not completely functional).

The controller 535 is configured to control the operation of the first and second switches 520, 530 in each parallel light circuit 510 based on the result of the comparison of the corresponding detected voltage signal with the stored reference voltage drop. Specifically, the controller 535 is configured to determine whether the detected voltage drop is either outside of the maintenance range, or outside the error range, as an indication of whether a corresponding light 165, 185 is functional, in need of maintenance, or broken.

The controller 535 is configured to either close the first switch 520 and open the second switch 530 in a given parallel light circuit 510 to allow the first light 165 to receive power while preventing the second light 185 from receiving power, or to close the second switch 530 and open the first switch 520 in the parallel light circuit 510 to allow the second leg 185 to receive power while preventing the first light 165 from receiving power.

The controller 535 is also configured to update the reference voltage drops over time to account for natural shifts in the voltage drops. It would be expected that over time an expected voltage drop across a first or second light 165, 185 might change slightly as the selected light 165, 185 ages. Therefore, to maintain an accurate value for the stored reference voltage drop, it would be desirable to update the stored reference voltage drop. One way to do this is to continuously update the stored reference voltage drop based on a time window of previous detected values. For example, the controller 535 might update the reference voltage drop based on a number of previous detected values (e.g., 20-100) by averaging them, performing a weighted average function on these values, or any other desirable function. These previous detected voltage drops can be stored in the memory 140 or in a volatile memory in the controller 535.

When there are no previous detected values (e.g., when the lighting system 500 is first operated), the controller 535 can be aware of a default value for a voltage drop in each parallel light circuit 510 or the memory 140 can contain such default values.

In some embodiments, the lighting system 500 can be operated for a short time before the controller 535 makes any decisions regarding the operating status of a given parallel light circuit 510 to provide enough samples of the detected voltage drops for the controller 535 to calculate a proper value to store for the reference voltage drop.

In addition, although the above description refers to the use of both a maintenance range and an error range, alternate embodiments could employ only a single error range.

The controller 535 can be a microprocessor, an ASIC, or any suitable circuitry for manipulating the detected voltage signals, accessing stored reference voltage drops from the memory 140, comparing detected voltage drops with the stored reference voltage drops, and controlling the first and second switches 520, 530 in each of the parallel light circuits 510.

Self-Repairing Lighting System—Fourth Disclosed Embodiment

Figure 6:
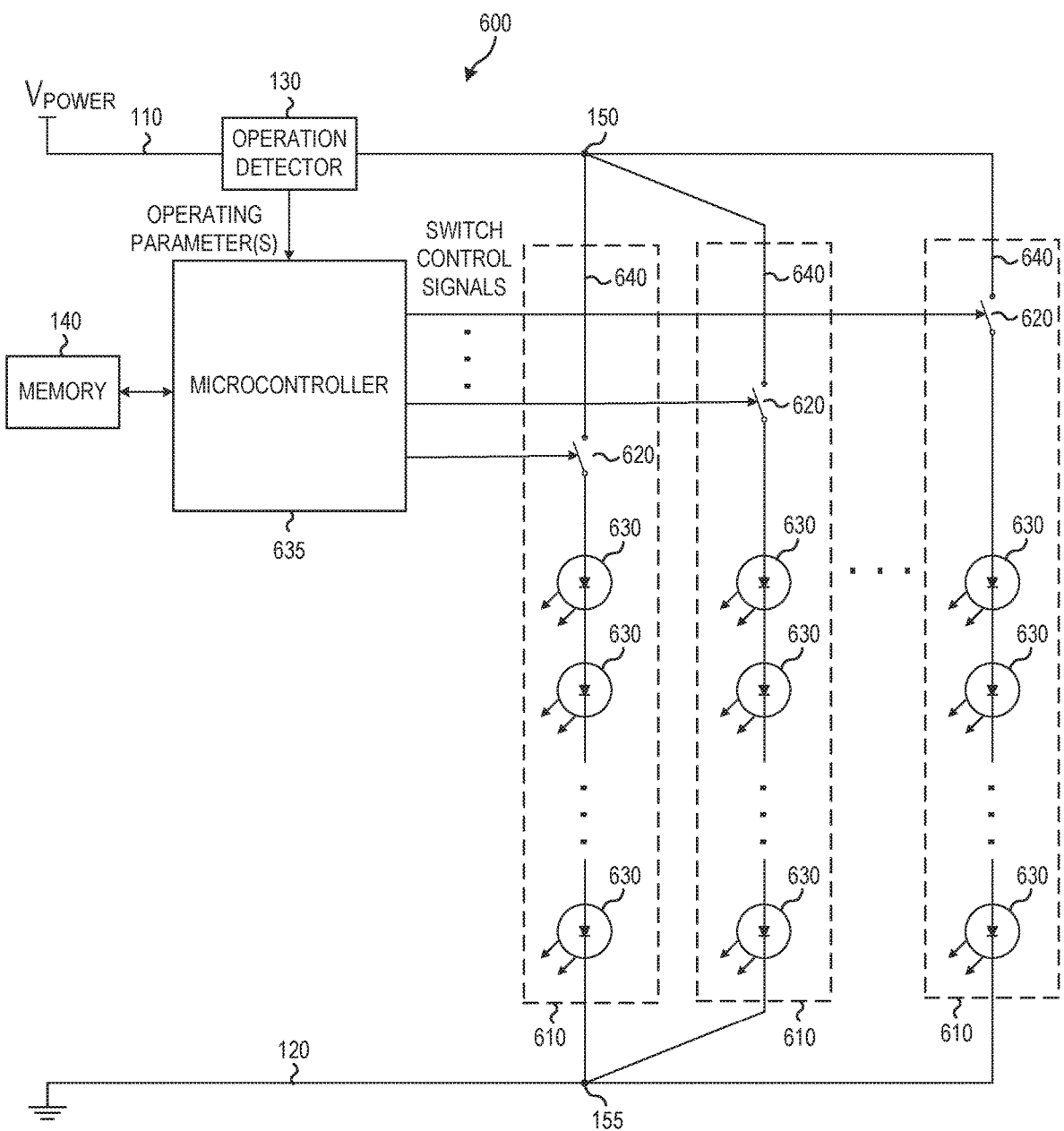
FIG. 6 is a block diagram of a self-repairing lighting system having two or more arrays of back-up lights according to disclosed embodiments.

FIG. 6 is a block diagram of a self-repairing lighting system 600 having two or more arrays of back-up lights according to disclosed embodiments. As shown in FIG. 6, the self-repairing lighting system 600 includes a power line 110, a ground line 115, a plurality of lighting circuits 610, an operation detector 130, a controller 135, and a memory 140. Each of the plurality of lighting circuits 610 is formed of a switch 620 and a plurality of lights 630 formed in series between the power node 150 and the ground node 155. Each of the plurality of lighting circuits 610 is formed in parallel with each of the other of the plurality of lighting circuits 610.

Elements with similar numbers operated as described above with respect to the self-repairing lighting system 100 of FIG. 1. A description of these elements will not be repeated below.

In each of the plurality of lighting circuits 610 the switch 620 is located on a conductive line 640 between the power node 150 and the ground node 155 and controls a current passing through the conductive line 640 to the lights 630 located on the conductive line 640. When the switch 620 is open, current cannot pass through the conductive line 170, and so the lights 630 will not receive power. When the switch 620 is closed, current will pass through the conductive line 640 and the lights 630 from the power line 110 to the ground line 115.

In one disclosed embodiment, the switches 620 can be single pole single throw (SPST) switches. Alternate embodiments can employ different switch types for the switches 620 as needed.

The plurality of lights 630 in each lighting circuit 610 are individual lighting elements connected in series between the power node 150 and the ground node 155. In one embodiment, the lights 630 are light-emitting diodes. However, alternate embodiments can employ different types of lights 630.

The controller 635 provides switch control signals to control the operation of the switches 620 in each of the plurality of lighting circuits 610.

The controller 635 receives the one or more detected operating parameters from the operation detector 130 and uses them to determine whether a selected one of the plurality of lighting circuits 610 is operating properly, is in need of maintenance, or has failed to operate properly. Based on this determination, the controller 635 generates the switch control signals to control the switches 620 in each of the plurality of lighting circuits 610 to select one of the plurality of lighting circuits 610. According to the disclosed embodiment the controller 635 maintains one of the switches 620 in a closed position, and all of the other switches 620 in an open position. In this way, only one of the plurality of lighting circuits 610 will be active at any given time.

For example, if the controller 635 selects a first lighting circuit 610, it generates a first switch control signal that instructs a switch 620 in a first lighting circuit 610 to be closed and generates switch control signals that instruct the switches 620 in the remaining lighting circuits 610 to be open. This allows power to flow from the power line 110 through the first lighting circuit 610 to the ground line 115 but prevents power from flowing from the power line 110 through the other lighting circuits 610 to the ground line 115.

Similarly, if the controller 635 selects a different lighting circuit 610, it generates a switch control signal that instructs the switch 620 in the selected lighting circuit 610 to be closed and generates switch control signals that instruct the switches 620 in all of the remaining lighting circuits 610 to be open. This allows power to flow from the power line 110 through the selected lighting circuit 610 to the ground line 110 but prevents power from flowing from the power line 110 through the non-selected lighting circuits 610 to the ground line 115.

After receiving the detected one or more operating parameters, the controller 635 compares the detected operating parameters with reference operating parameters stored in the memory 140. In making this comparison, the controller 635 can either directly compare the detected one or more operating parameters with stored reference operating parameters or may manipulate the detected one or more operating parameters to place them in a more convenient format.

As discussed above with respect to the first disclosed embodiment, the detector 130 could provide a direct value for a voltage drop across a reference resistor in the power line 110. In this case, the controller 635 compares this direct value for the voltage drop with a reference value for an expected voltage drop. In an alternate embodiment, the detector 130 could provide values for a first voltage at a first end of the reference resistor and a second voltage at a second end of the reference resistor. In this case, the controller 635 could first subtract the second voltage from the first voltage to obtain a value for a voltage drop across the reference resistor, and then compare that determined voltage drop with a reference value for the voltage drop.

The controller 635 determines whether the detected one or more operating parameters are within a set range (i.e., tolerance) of the stored reference operating parameters. This set range can be an error range that indicates whether or not a corresponding lighting circuit 610 is functional, or it could be a maintenance range that indicates whether or not a corresponding lighting circuit 610 requires maintenance. Generally, the maintenance range will be smaller than the error range, such that a detected operating parameter could have three possible positions: (1) inside both the maintenance range and the error range (indicating that the lighting circuit 610 is operating properly), (2) outside the maintenance range but inside the error range (indicating that the lighting circuit 610 is still functional, but requires maintenance), or (3) outside both the maintenance range and the error range (indicating that the lighting circuit 610 is not completely functional).

The controller 635 is configured to control the operation of the switches 620 in each of the lighting circuit 610 based on the result of the comparison of the detected one or more operating parameters with the stored reference operating parameters. Specifically, the controller 635 is configured to determine whether the one or more operating parameters are either outside of the maintenance range, or outside the error range, as an indication of whether a selected one of the first or second lighting circuits 610 are functional, in need of maintenance, or broken.

The controller 635 is configured to close one of the switches 620 and open the remaining switches 620 to allow a selected lighting circuit 610 to receive power while preventing the non-selected lighting circuits 610 from receiving power.

The controller 635 is also configured to update the reference operating parameters over time to account for natural shifts in the operating parameters. For example, if the operation detector 130 detects a voltage across a reference resistor, it would be expected that over time an expected value of that voltage might change slightly as the selected lighting circuit 610 ages. Therefore, to maintain an accurate value for the stored reference operating parameter, it would be desirable to update the stored reference operating parameter. One way to do this is to continuously update the stored reference operating parameter based on a time window of previous detected values. For example, the controller 635 might update the reference operating parameter based on a number of previous detected values (e.g., 20-100) by averaging them, performing a weighted average function on these values, or any other desirable function. These previous detected values can be stored in the memory 140 or in a volatile memory in the controller 635.

When there are no previous detected values (e.g., when the lighting system 600 is first operated), the controller 635 can be aware of a default value for the operating parameter, or the memory 140 can contain such a default value.

In some embodiments, the lighting system can be operated for a short time before the controller 635 makes any decisions regarding the operating status of a given lighting circuit 610 to provide enough samples of the detected one or more operating parameters for the controller 635 to calculate a proper value to store for the reference operating parameters.

In addition, although the above description refers to the use of both a maintenance range and error range, alternate embodiments could employ only a single error range.

The controller 635 can be a microprocessor, an ASIC, or any suitable circuitry for manipulating the detected one or more operating parameters, accessing stored reference operating parameters from the memory 140, comparing the detected one or more operating parameters with the stored reference operating parameters, and controlling the switches 620.

Self-Repairing Lighting System—Alternate Embodiments

Although several specific embodiments of a self-repairing lighting system are disclosed above, these are by way of example only. Alternate embodiments could combine various aspects of each of the above disclosed embodiments.

Method of Self-Repairing a Lighting System—First Disclosed Embodiment

Figure 7:
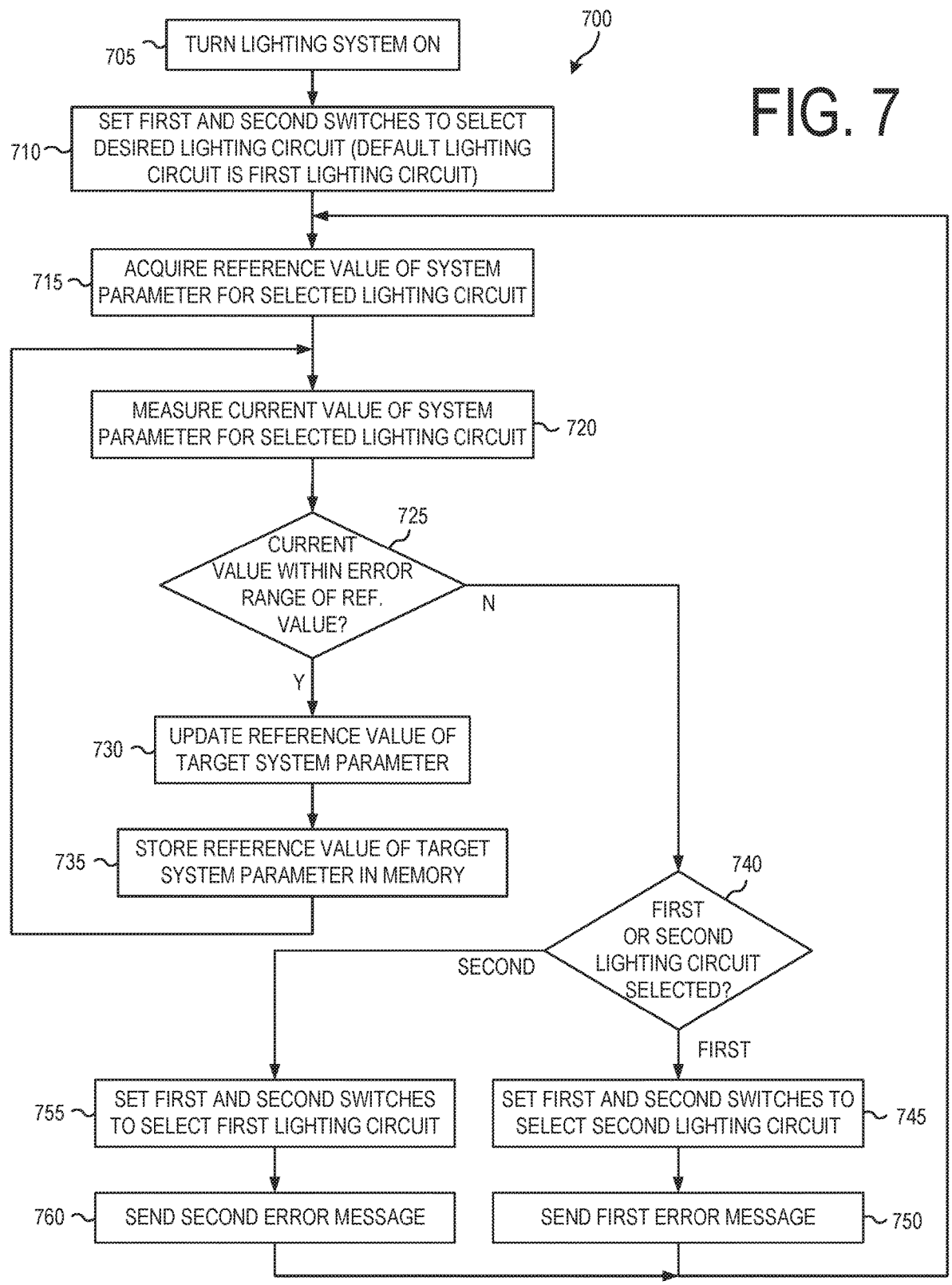
FIG. 7 is a flow chart describing the operation of a self-repairing lighting system according to disclosed embodiments.

FIG. 7 is a flow chart describing the operation 700 of a self-repairing lighting system according to disclosed embodiments. In this particular embodiment, a lighting system having two parallel arrays of lights (e.g., lighting circuits) is described. However, alternate embodiments could use additional arrays of lights.

As shown in FIG. 7, the operation 700 begins when the light system is turned on (705).

After the lighting system is turned on, first and second switches are set in each of the two lighting circuits to select a desired lighting circuit (710). One particular lighting circuit (e.g., a first lighting circuit) can be selected as a default lighting circuit to select. However, the lighting system can also store information about a currently selected lighting circuit so that upon system start a lighting circuit other than the default lighting circuit can be selected.

In setting the first and second switches, one of the first and second switches is closed and the other of the first and second switches is opened. In this way, current can flow through a selected lighting circuit, and can be prevented from flowing through a non-selected lighting circuit.

After a desired lighting circuit is selected, the system acquires a reference value of one or more system parameters for the selected lighting circuit. These one or more lighting parameters can be a voltage across a reference resistor (e.g., a sense resistor), a current passing through a power line providing power to the selected lighting circuit, or any other system parameter that could indicate whether the selected lighting circuit was operating properly.

This reference value could be a default value, or it could be a stored value saved in a memory from a prior operation of the lighting system. In some embodiments, the lighting system can be operated for a period of time to allow the lighting system to adjust a stored value or a default value to account for a current operating status of the lighting system.

Once the reference value of the one or more system parameters are acquired, the lighting system then measures (i.e., detects) a current value of one or more system parameters for the selected lighting system (720).

The lighting system then compares the measured current value of the one or more system parameters with the stored value of the one or system parameters to see if the current value (or values) are within error range of the reference value of the one or more system parameters (725).

Typically, the one or more system parameters will be distilled down to a single value (e.g., a single voltage or current) that can be compared with a single reference value. To the extent that multiple system parameters are used, a more complicated determination can be performed to determine whether or not the selected lighting circuit is operating properly.

In some embodiments, the error range can be centered on the reference value such that the measured current value is within the error range if it is within a certain range above or below the reference value. In other embodiments the error range can be asymmetric such that the measured current value is within the error range if it is within a certain first range above the reference value or within a different second range below the reference value.

The error range is selected such that it provides an indication as to whether the selected lighting circuit is operating properly. For example, the system parameter may be a voltage across a reference resistor that is in series with the selected lighting circuit. In this case, the voltage across that reference resistor should remain relatively stable (plus or minus a certain amount) with respect to a reference voltage if all of the lights in the selected lighting circuit are operating properly. However, if one or more of the lights in the lighting circuit malfunction, this will cause the voltage across the reference resistor to spike in one direction such that the measured voltage across the reference resistor will vary from a reference value of the voltage across the reference resistor by more than the error range. A similar analysis can be performed if the system parameter were a current across a power line that is provided to the selected lighting circuit.

If the current value of the system parameter is within the error range of the reference value of the system parameter, then the lighting system determines that the lighting circuit is functioning properly. In this case the lighting system will update the reference value of the target system parameter. This updating is performed because over time and expected value of the target system parameter may vary slightly as the lighting system ages. For example, if the system parameter were a current passing through a power line to the selected lighting circuit, it would be expected that a so-called normal current passing through the power line will fluctuate over time as the selected lighting system ages. In order to properly determine when the current passing through the power line should be considered abnormal, it is necessary to update the expected (i.e., stored) value for the current. The same is true if the system parameter were a voltage or any other parameter.

The lighting system can update the reference value of the target system parameter in a number of ways. One alternative would be to save a number of measured values for the target system parameter over time and either average those measured values or perform a weighted average on those measured values. For example, the lighting system could save the last 20 measured values for the target system parameter and use those 20 measured values to generate a new stored reference value for the target system parameter. In the case when the lighting system is newly turned on, it can use a default or stored value for the target system parameter and operate for a time without making any decisions as to whether an error has occurred (725) until the required number of measured values have been acquired to update the stored value.

Once the reference value of the target system parameter is updated (730), the updated reference value of the target system parameter is then stored in some kind of memory (735). This newly stored value can then be used in the future when it is necessary to start operation afresh for a given lighting circuit. Although the updated reference value is stored in a nonvolatile memory, the lighting system (e.g., a controller) may retain that updated reference value in a volatile memory where it can be used for a future determination.

After the updated reference value of the target system parameter is stored in memory (735) the lighting system measures a new current value of the system parameter for the selected lighting circuit (720) and continues the monitoring process. In this way, the process of determining whether an error has occurred continues repeatedly, and the reference value of the target system parameter is continually updated.

If, however a measured current value of the target system parameter is determined to be outside of the error range of the reference value of the target system parameter (725), then the lighting system determines that an error has occurred in the selected lighting circuit (e.g., one or more lights in the selected lighting circuit have ceased to function properly), and steps will be taken to select a different lighting circuit.

The lighting circuit first determines whether the currently selected lighting circuit is a first lighting circuit (i.e., a default lighting circuit) or a second lighting circuit (i.e., a backup lighting circuit) (740). When a new lighting system is first turned on, it will select the first lighting circuit as a default, leaving the second lighting circuit as a backup. However, during the course of operation it is possible that the lighting system will have previously moved to the second lighting circuit. Therefore, it is necessary for the lighting system to determine at this stage of operation whether the first or second lighting circuit is currently selected.

If the first lighting circuit is currently selected (i.e., the lighting system is still using the default lighting circuit) then the lighting system sets the first and second switches in the first and second lighting circuits to select the second lighting circuit (745). In other words, the lighting system opens the switch in the first lighting circuit (for which an error has just been detected), preventing current from flowing through the first lighting circuit, and closes the switch and the second lighting circuit allowing current to flow through the second lighting circuit. In this way, it switches a selected lighting circuit from the first lighting circuit to the second lighting circuit.

The lighting system can then send a first error message to a user indicating that an error has been found in the first lighting system (750). This error message could include an audible alarm going off, an indicator light turning on, a message being sent to a user via email, text, or any other messaging system, or any similar indication that would alert a user that some or all of the first lighting circuit is not functioning properly. In some embodiments, the first error message could include multiple first error messages in different formats.

Although the sending of a first error message may be omitted in some embodiments, it can provide valuable feedback to a user indicating that the lighting system should be serviced or replaced.

By switching to the second lighting circuit when the first lighting circuit malfunctions and sending an error message to a user regarding that malfunction, the lighting circuit can maintain full operation of the desired lighting function of the lighting device even when a lighting malfunction occurs. If the entire lighting device or the defective lighting circuit are serviced or replaced before the second lighting circuit fails, the users lighting needs need never be interrupted, even when a lighting malfunction occurs.

Once the second lighting circuit is selected (745) and any first error message is sent (750), the lighting system returns to acquiring a reference value of a target system parameter for the newly selected lighting circuit (i.e., the second lighting circuit) (715). The lighting system then proceeds to measure a current value of the system parameter for the newly selected lighting circuit (720), etc.

In some cases, however, the lighting system will already have moved to the second lighting circuit. In such case, when the lighting system determines that the current measured value of the target system parameter is outside of the error range of the stored reference value of the target system parameter, the lighting system may determine that the second lighting array is already selected (740).

If that happens, the lighting system can set the first and second switches to again select the first lighting circuit (755). Likewise, the lighting system can then send a second error message to the user indicating that an error has been found in the second lighting circuit (760). Since the default is to use the first lighting circuit, this operation should only be reached when both the first lighting circuit and the second lighting circuit have both suffered a failure. As a result, the second error message can indicate that both lighting elements are deficient, indicating that the lighting system may no longer operate according to system requirements.

As with the first error message, the second error message could include an audible alarm going off, an indicator light turning on, a message being sent to a user via email, text, or any other messaging system, or any similar indication that would alert a user that some or all of the first lighting circuit is not functioning properly. In some embodiments, the second error message could include multiple second error messages in different formats.

Once the first lighting circuit is selected (755) and any second error message is sent (760), the lighting system returns to acquiring a reference value of a target system parameter for the newly selected lighting circuit (i.e., the first lighting circuit) (715). The lighting system then proceeds to measure a current value of the system parameter for the newly selected lighting circuit (720), and continues processing In order to prevent a continual loop of switching from the first lighting array to the second lighting array, the lighting system should include some means of indicating that a failure has occurred in the currently selected lighting circuit and either changing the stored reference value for the target system parameter to account for the previously detected error, or stopping the comparison of the measured current value of the target system parameter with the stored reference value of the target system parameter.

In some embodiments it may be possible to determine the level of impairment in a selected lighting circuit (i.e., how many individual lights in the selected lighting circuit have failed). If this is the case, it may be possible to swap between the first and second lighting circuits to select the lighting circuit that has the most functional lights still in it.

Acquiring a Reference Value of a System Parameter

Figure 8:
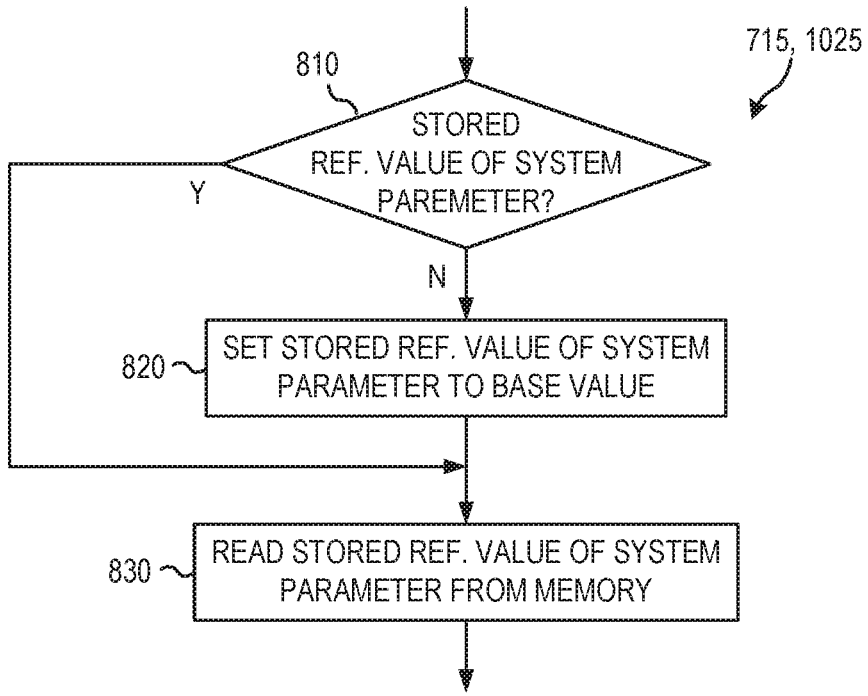
FIG. 8 is a flow chart describing the operation of acquiring a reference value of a system parameter for a selected light of FIG. 7 according to disclosed embodiments.

FIG. 8 is a flow chart 715 describing the operation of acquiring a reference value of a system parameter for a selected light of FIG. 7 according to disclosed embodiments.

As shown in FIG. 8, the process 715 begins by determining whether the lighting system has a stored reference value of the target system parameter for the currently selected lighting circuit (810). The lighting system may already have a stored reference value of the target system parameter for the currently selected lighting circuit if the lighting system has been in operation previously but has been shut down for a time. For example, if the lighting system were on a vehicle, this may occur when the vehicle is restarted after previous operation.

If the lighting system does not have a stored reference value of the target system parameter for the selected lighting circuit (e.g., the lighting circuit is being operated for the first time), then the lighting system will set the reference value of the target system parameter to a default base value stored in an associated memory and store that value in a nonvolatile memory (820).

The lighting system will then read the stored reference value of the target system parameter for the selected lighting circuit from memory (830). In some embodiments where the lighting system has newly stored a default value for the reference value of the target system parameter, the lighting system may simply read the reference value of the target system parameter from a volatile memory where it was just set. In other situations, the lighting system can read the stored reference value of the target system parameter from a nonvolatile memory.

If, however the lighting system determines that it does have a stored reference value of the target system parameter for the selected lighting circuit in memory (810), Then the lighting system will proceed to directly read the stored reference value of the target system parameter from the memory (generally a nonvolatile memory) (830).

In this way, the lighting system can determine a reference value for a system parameter even if there is no reference value currently stored in memory.

Furthermore, if the lighting system is required to set the reference value of the target system parameter as a base value, then the lighting system may operate to cycle through several updates of the reference value of the target system parameter based on actual measured values of the system parameter. Because every lighting circuit is unique, their actual performance data may vary slightly from the default base values. Allowing several cycles of updating the stored reference value of the target system parameter can provide a reference value for the target system parameter that more accurately reflects the actual performance of the selected lighting circuit.

Method of Self-Repairing a Lighting System—Second Disclosed Embodiment

Figure 9A:
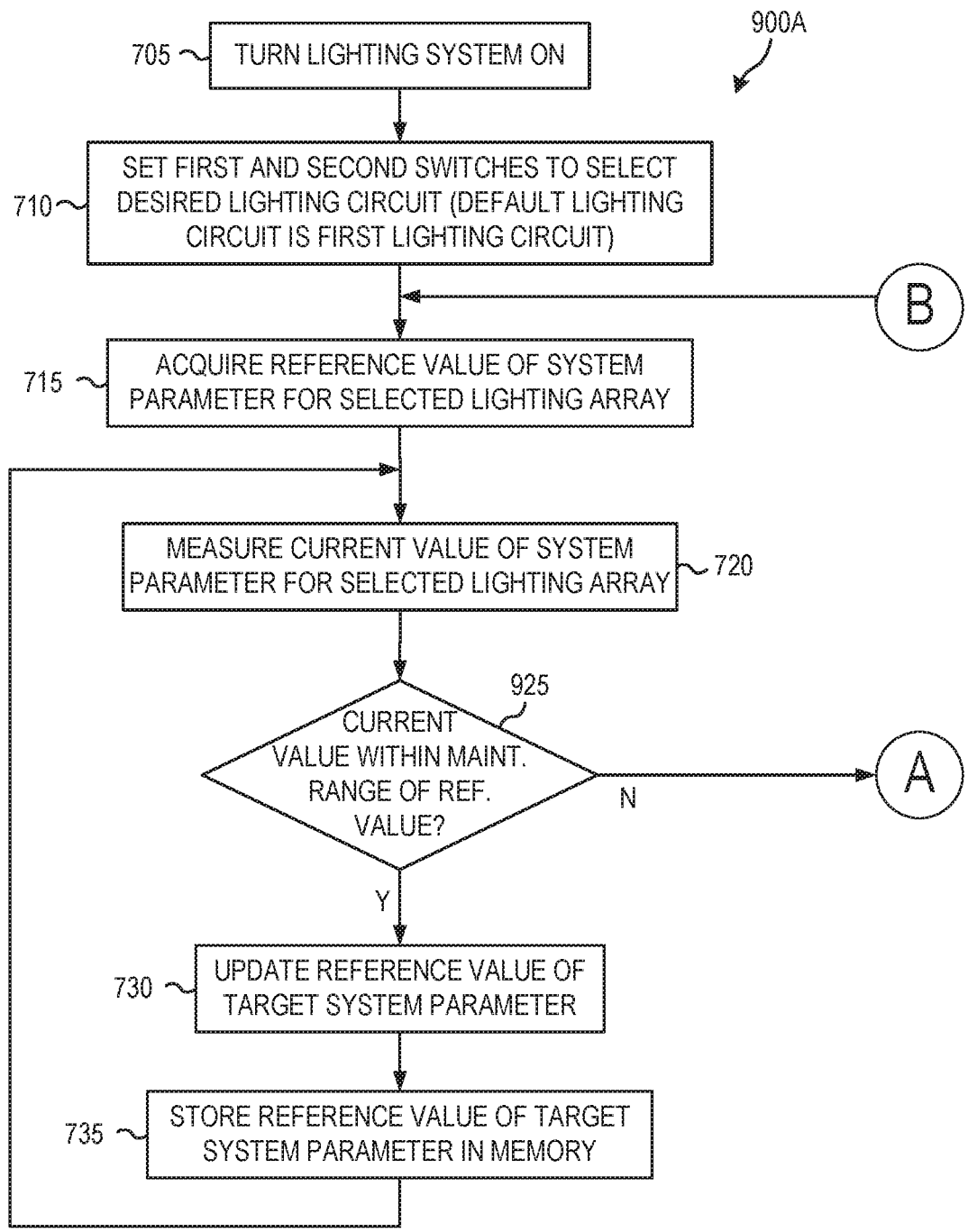
FIGS. 9A and 9B illustrate a flow chart describing an alternate operation of a self-repairing lighting system according to other disclosed embodiments.
Figure 9B:
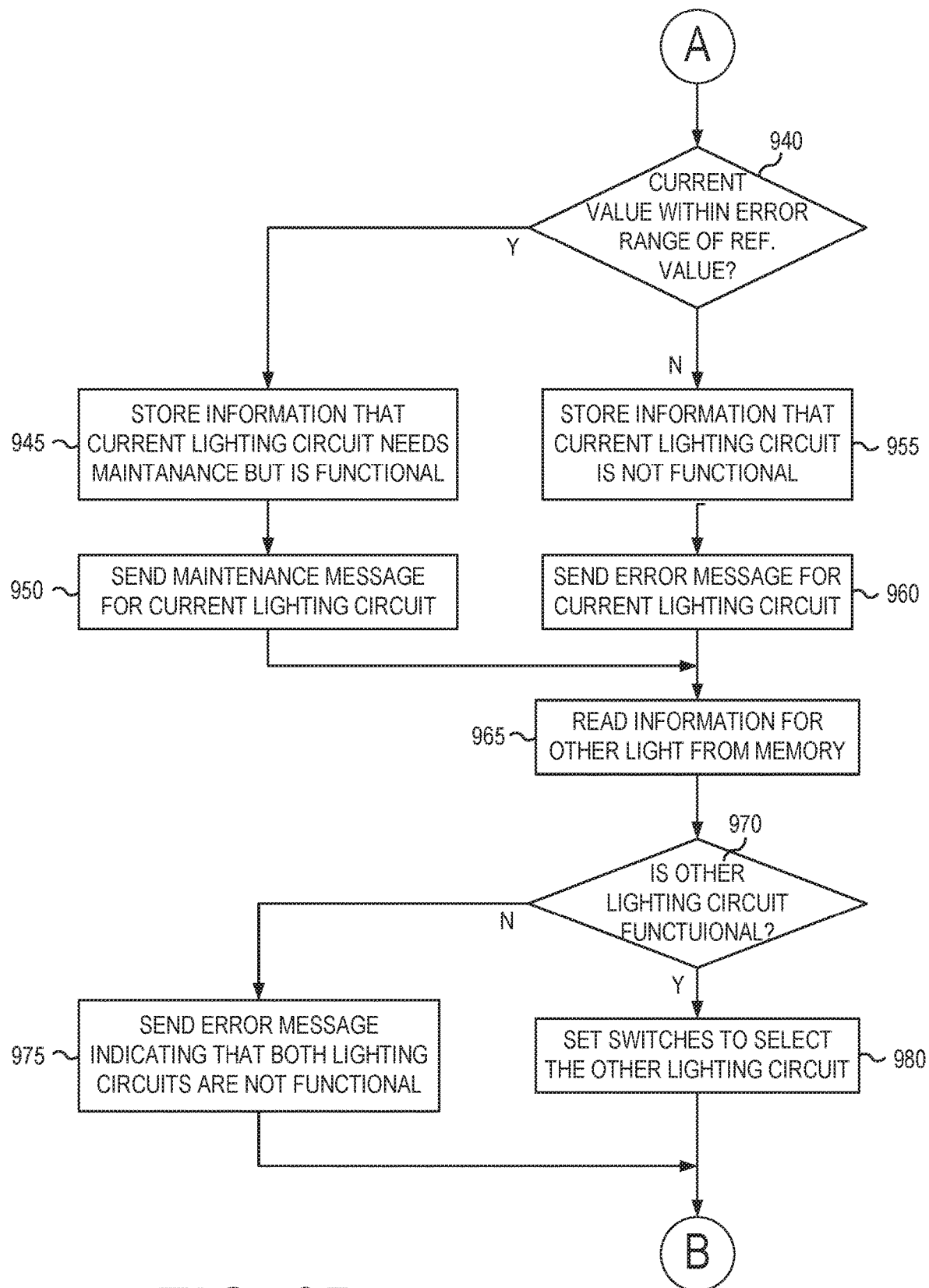

FIGS. 9A and 9B illustrate a flow chart describing an alternate operation 900A, 900B of a self-repairing lighting system according to other disclosed embodiments. This alternate operation 900A, 900B employees of both an error range and a maintenance range when analyzing measured operating parameters.

Elements with similar numbers operated as described above with respect to the operation 700 of a self-repairing lighting system of FIG. 7. A description of these elements will not be repeated below.

As shown in FIGS. 9A and 9B, operation begins by turning the lighting system on (705), setting the first and second switches to select the desired lighting circuit (710), acquiring reference values of target system parameters for the selected lighting circuit (715), and measuring a current value of the target system parameter for the selected lighting circuit (720). These operations are comparable to those performed in the operation 700 described with respect to FIG. 7.

The lighting system then compares the measured current value of the one or more system parameters with the stored value of the one or system parameters to see if the current value (or values) are within a maintenance range of the reference value of the one or more system parameters (925).

As with the operation 700 of FIG. 7, the one or more system parameters will be distilled down to a single value (e.g., a single voltage or current) that can be compared with a single reference value. To the extent that multiple system parameters are used, a more complicated determination can be performed to determine whether or not the selected lighting circuit is operating properly.

In some embodiments, the maintenance range can be centered on the reference value such that the measured current value is within the maintenance range if it is within a certain range above or below the reference value. In other embodiments the maintenance range can be asymmetric such that the measured current value is within the maintenance range if it is within a certain first range above the reference value or within a different second range below the reference value.

The maintenance range is selected such that it provides an indication as to whether the selected lighting circuit is operating properly or is showing signs that it may fail soon. For example, the system parameter may be a voltage across a reference resistor that is in the series with the selected lighting circuit. In this case, the voltage across that reference resistor should remain relatively stable (plus or minus a certain amount with respect to a reference voltage) if all of the lights in the selected lighting circuit are operating properly. However, if one or more of the lights in the lighting circuit begins to wear out, this may cause the voltage across the reference resistor to fluctuate in one direction such that the measured voltage across the reference resistor will vary from a reference value of the voltage across the reference resistor by more than the maintenance range. A similar analysis can be performed if the system parameter were a current across a power line that is provided to the selected lighting circuit.

If the current value of the system parameter is within the maintenance range of the reference value of the system parameter, then the lighting system determines that the lighting circuit is functioning properly. In this case the lighting system will update the reference value of the target system parameter (730) and store the updated reference value of the target system parameter in memory (735). These two operations are similar to those described above with respect to FIG. 7.

After the updated reference value of the target system parameter is stored in memory (735) the lighting system measures a new current value of the system parameter for the selected lighting circuit (720) and continues the monitoring process. In this way, the process of determining whether a lighting circuit requires maintenance continues repeatedly, and the reference value of the target system parameter is continually updated.

If, however, a measured current value of the target system parameter is determined to be outside of the maintenance range of the reference value of the target system parameter (925), then the lighting system determines that at the very least maintenance is required for the currently selected lighting circuit.

The lighting system then compares the measured current value of the one or more system parameters with the stored value of the one or system parameters to see if the current value (or values) are within error range of the reference value of the one or more system parameters (940). This is similar to the comparable operation (725) described above with respect to FIG. 7 above. Generally, the error range will be larger than the maintenance range. In other words, it would be possible for a measured system parameter to be outside of the maintenance range but still within the error range.

Typically, the one or more system parameters will be distilled down to a single value (e.g., a single voltage or current) that can be compared with a single reference value. To the extent that multiple system parameters are used, a more complicated determination can be performed to determine whether or not the selected lighting circuit is operating properly.

As noted above, in some embodiments, the error range can be centered on the reference value such that the measured current value is within the error range if it is within a certain range above or below the reference value. In other embodiments the error range can be asymmetric such that the measured current value is within the error range if it is within a certain first range above the reference value or within a different second range below the reference value.

The error range is selected such that it provides an indication as to whether the selected lighting circuit is operating properly. For example, the system parameter may be a voltage across a reference resistor that is in the series with the selected lighting circuit. In this case, the voltage across that reference resistor should remain relatively stable (plus or minus a certain amount with respect to a reference voltage) if all the lights in the selected lighting circuit are operating properly. However, if one or more of the lights in the lighting circuit malfunction, this will cause the voltage across the reference resistor to spike in one direction such that the measured voltage across the reference resistor will vary from a reference value of the voltage across the reference resistor by more than the error range. A similar analysis can be performed if the system parameter were a current across a power line that is provided to the selected lighting circuit.

If the current value of the system parameter is within the error range of the reference value of the system parameter, then the lighting system determines that the lighting circuit is functioning but requires maintenance. This is because at this point the lighting system has already determined that the current value of the system parameter is outside of the maintenance range.

In this case the lighting system may store information in the memory that the current lighting circuit requires maintenance but is still functional (945). This information will allow the lighting system to make a later determination as to whether this lighting circuit should be used again in the future.

The lighting system can then send a maintenance message to a user indicating that the currently selected lighting circuit requires maintenance (950). This maintenance message could include an audible alarm going off, an indicator light turning on, a message being sent to a user via email, text, or any other messaging system, or any similar indication that would alert a user that some or all of the currently selected lighting circuit requires maintenance. In some embodiments, the maintenance message could include multiple maintenance messages in different formats.

Although the sending of a maintenance message may be omitted in some embodiments, it can provide valuable feedback to a user indicating that the lighting system should be serviced or replaced. However, unlike when only an error message is provided, the maintenance message may be first sent while both the first and second lighting circuits are still fully functional.

If, however a measured current value of the target system parameter is determined to be outside of the error range of the reference value of the target system parameter (940), then the lighting system determines that an error has occurred in the selected lighting circuit (i.e., one or more lights in the selected lighting circuit) have ceased to function properly, and steps will be taken to lighting circuit.

In this case the lighting system may store information in the memory that the current lighting circuit is not functional (955). This information will allow the lighting system to make a later determination as to whether this lighting circuit should be used again in the future.

The lighting system can then send an error message to a user indicating that some or all of the currently selected lighting circuit has stopped working (960). This error message could include an audible alarm going off, an indicator light turning on, a message being sent to a user via email, text, or any other messaging system, or any similar indication that would alert a user that some or all of the currently selected lighting circuit has stopped functioning properly. In some embodiments, the error message could include multiple error messages in different formats.

Although the sending of an error message may be omitted in some embodiments, it can provide valuable feedback to a user indicating that the lighting system should be serviced or replaced.

Having determined that the currently selected lighting circuit either needs maintenance or has malfunctioned, the lighting system then reads the information about the other light from memory (970). This information will indicate whether the other light is perfectly functional, functional but requiring maintenance, or nonfunctional.

The lighting system will then determine whether the other lighting circuit (i.e., the non-selected lighting circuit) in the lighting system is still functional (970). This can include the non-selected lighting circuit being perfectly functional or being functional but requiring maintenance.

If the other light is functional, the lighting system sets the various switches in the lighting system to select the other lighting circuit (980) and returns to the operation of acquiring a reference value of the system parameter for the newly selected lighting circuit (715).

If, however, the other light is nonfunctional, the lighting system can then send an error message to a user indicating that some or all of both lighting circuits have stopped working (975). This error message could include an audible alarm going off, an indicator light turning on, a message being sent to a user via email, text, or any other messaging system, or any similar indication that would alert a user that some or all of the currently selected lighting circuit has stopped functioning properly. In some embodiments, the error message could include multiple error messages in different formats.

Because both lighting circuits are nonfunctional to some degree, the lighting system in this embodiment does not change the selected lighting element. Instead, the lighting system returns to the operation of acquiring a reference value of the system parameter for the currently selected lighting circuit (715).

In order to prevent a continual sending of error messages, the lighting system should include some means of either changing the stored reference value for the target system parameter to account for the previously detected error or stopping the comparison of the measured current value of the target system parameter with the stored reference value of the target system parameter.

In some embodiments it may be possible to determine the level of impairment in a selected lighting circuit (i.e., how many individual lights in the selected lighting circuit have failed). If this is the case, it may be possible to swap between the first and second lighting circuits to select the lighting circuit that has the most functional lights still in it.

In addition, although FIG. 9B discloses that the lighting system does not switch to select the other light when the other light is determined to be nonfunctional (970), this is by way of example only. In alternate embodiments, the lighting system can make a further determination as to which of the lighting circuits includes the fewest malfunctioning elements. In such a case, if the non-selected lighting circuit includes fewer malfunctioning elements than the selected lighting circuit, the lighting system can switch the selected and non-selected lighting circuits such that the lighting circuit with fewer malfunctioning elements is selected.

Method of Self-Repairing a Lighting System—Third Disclosed Embodiment

Figure 10:
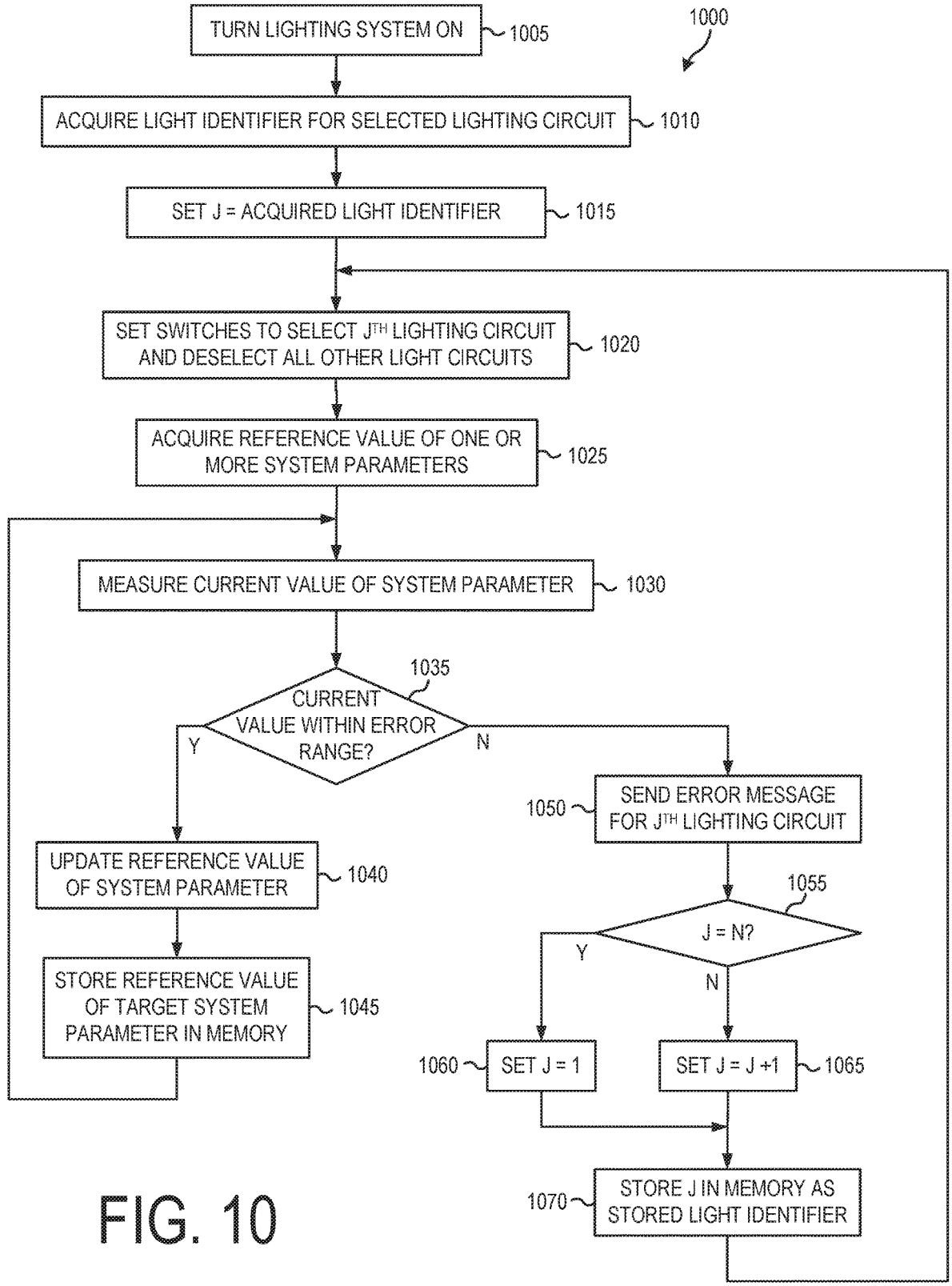
FIG. 10 is a flow chart describing another alternate operation of a self-repairing lighting system according to disclosed embodiments.

FIG. 10 is a flow chart 1000 describing another alternate operation of a self-repairing lighting system according to disclosed embodiments. In this alternate embodiment, a plurality (N) of light circuits are provided, one of which is activated at any given time.

As shown in FIG. 10, the operation 1000 begins when the light system is turned on (1005).

The lighting system then acquires a light identifier for a currently selected lighting circuit (1010). This light identifier will vary from 1 to N, where N is the total number of light circuits. As a default, the lighting system will select a first lighting circuit from among the plurality of lighting circuits. This will occur when the lighting system is turned on for the first time. However, during later operation of the lighting system, the lighting system will reference a stored light identifier that identifies the currently selected lighting circuit. For example, if the lighting system is in a vehicle, the lighting system it may be turned off when the vehicle is turned off and will be turned on again when the vehicle is again turned on.

The lighting system then sets a tracking value J equal to the acquired light identifier (1015). This value J will be used to control the currently selected lighting circuit.

Once the value J is set to the acquired light identifier, the lighting system sets the switches in the plurality of lighting circuits to select the $J^{th}$ lighting circuit (1020). The lighting system can do this by setting a switch in the $J^{th}$ lighting circuit to be closed allowing current to flow from a power source to ground through the $J^{th}$ lighting circuit and setting the switches in all of the other lighting circuits to be open, preventing current from flowing from the power source to ground through the other lighting circuits.

After a $J^{th}$ lighting circuit is selected, the lighting system acquires a reference value of one or more system parameters for the $J^{th}$ lighting circuit (1025). These one or more lighting parameters can be a voltage across a reference resistor (e.g., a sense resistor), a current passing through a power line providing power to the selected lighting circuit, or any other system parameter that could indicate whether the $J^{th}$ lighting circuit was operating properly. This operation is comparable to the similar operation 715 described above with respect to FIG. 7. The operations shown in FIG. 8 likewise describes the operation 1025.

As in previous embodiments, this reference value could be a default value, or it could be a stored value saved in a memory from a prior operation of the lighting system. In some embodiments, the lighting system can be operated for a period of time to allow the lighting system to adjust a stored value or a default value to account for a current operating status of the lighting system.

Once the reference value of the one or more system parameters are acquired, the lighting system then measures (i.e., detects) a current value of one or more system parameters for the selected lighting system (1030).

The lighting system then compares the measured current value of the one or more system parameters with the stored value of the one or system parameters to see if the current value (or values) are within error range of the reference value of the one or more system parameters (1035).

Typically, the one or more system parameters will be distilled down to a single value (e.g., a single voltage or current) that can be compared with a single reference value. To the extent that multiple system parameters are used, a more complicated determination can be performed to determine whether or not the selected lighting circuit is operating properly.

In some embodiments, the error range can be centered on the reference value such that the measured current value is within the error range if it is within a certain range above or below the reference value. In other embodiments the error range can be asymmetric such that the measured current value is within the error range if it is within a certain first range above the reference value or within a different second range below the reference value.

The error range is selected such that it provides an indication as to whether the selected lighting circuit is operating properly. For example, the system parameter may be a voltage across a reference resistor that is in the series with the selected lighting circuit. In this case, the voltage across that reference resistor should remain relatively stable (plus or minus a certain amount with respect to a reference voltage) if all of the lights in the selected lighting circuit are operating properly. However, if one or more of the lights in the lighting circuit malfunction, this will cause the voltage across the reference resistor to spike in one direction such that the measured voltage across the reference resistor will vary from a reference value of the voltage across the reference resistor by more than the error range. A similar analysis can be performed if the system parameter were a current across a power line that is provided to the selected lighting circuit.

If the current value of the system parameter is within the error range of the reference value of the system parameter, then the lighting system determines that the lighting circuit is functioning properly. In this case the lighting system will update the reference value of the target system parameter (1040). This updating is performed because over time an expected value of the target system parameter may vary slightly as the lighting system ages. For example, if the system parameter were a current passing through a power line to the selected lighting circuit, it would be expected that a so-called normal current passing through the power line will fluctuate over time as the selected lighting system ages. In order to properly determine when the current passing through the power line should be considered abnormal, it is necessary to update the expected (i.e., stored) value for the current. The same is true if the system parameter were a voltage or any other parameter.

The lighting system can update the reference value of the target system parameter in a number of ways. One alternative would be to save a number of measured values for the target system parameter over time and either average those measured values or perform a weighted average on those measured values. For example, the lighting system could save the last 20 measured values for the target system parameter and use those 20 measured values to generate a new stored reference value for the target system parameter. In the case when the lighting system is newly turned on, it can use a default or stored value for the target system parameter and operate for a time without making any decisions as to whether an error has occurred (1035) until the required number of measured values have been acquired to update the stored value.

Once the reference value of the target system parameter is updated (1040), the updated reference value of the target system parameter is then stored in some kind of memory (1045). This newly stored value can then be used in the future when it is necessary to start operation afresh for the $J^{th}$ lighting circuit. Although the updated reference value is stored in a nonvolatile memory, the lighting system (e.g., a controller) may retain that updated reference value in a volatile memory where it can be used for a future determination.

After the updated reference value of the target system parameter is stored in memory (1045) the lighting system measures a new current value of the system parameter for the $J^{th}$ lighting circuit (1030) and continues the monitoring process. In this way, the process of determining whether an error has occurred continues repeatedly, and the reference value of the target system parameter is continually updated.

If, however a measured current value of the target system parameter is determined to be outside of the error range of the reference value of the target system parameter (1035), then the lighting system determines that an error has occurred in the $J^{th}$ lighting circuit (e.g., one or more lights in the $J^{th}$ lighting circuit have ceased to function properly), and steps will be taken to keep the lighting system functioning properly.

The lighting system can then send an error message to a user indicating that an error has been found in the $J^{r}$ lighting circuit (1050). This error message could include an audible alarm going off, an indicator light turning on, a message being sent to a user via email, text, or any other messaging system, or any similar indication that would alert a user that some or all of the first lighting circuit is not functioning properly. In some embodiments, the first error message could include multiple first error messages in different formats.

Although the sending of an error message may be omitted in some embodiments, it can provide valuable feedback to a user indicating that the lighting system should be serviced or replaced.

The lighting system then determines whether J is equal to the total number of available lighting circuits (N) (1055). In other words, the lighting system determines whether the currently selected lighting circuit (i.e., the $J^{th}$ lighting circuit) is the last of the available lighting circuits.

If J does not equal N (i.e., if the $J^{th}$ lighting circuit is not the last of the available lighting circuits), the lighting system sets J to be equal to J+1 (1065). In other words, the lighting system sets a selected one of the J lighting circuits to be the next available lighting circuit. For example, if there were five lighting circuits and the lighting system were currently using the second lighting circuit, it would change the indexing value J such that the lighting system now selected the third lighting circuit.

The lighting system will then store the new value of J in memory as the new stored light identifier (1070) and will then return to set the switches to select the new $J^{th}$ lighting circuit and deselect all of the other lighting circuits (1020). Operation will continue as normal from that portion of the process.

If, however, J is determined to be equal to N (i.e., if the $J^{th}$ lighting circuit is the last of the available lighting circuits), the lighting system sets J to be equal to 1 (1060). In other words, the lighting system sets the selected lighting circuit to be the first lighting circuit again. This has the disadvantage that by this point in the process the first lighting circuit has already been determined to include an error. However, if the lighting system has not been repaired or replaced by this point, there will be no choice but to a lighting system that already contains one or more broken lights.

Once the value of J is set equal to 1, the lighting system will then store the new value of J in memory as the new stored light identifier (1070) and will then return to set the switches to select the new $J^{th}$ lighting circuit and deselect all of the other lighting circuits (1020). Operation will continue as normal from that portion of the process.

In order to prevent a continual loop of rotating between the N lighting circuits, the lighting system should include some means of indicating that a failure has occurred in the currently selected lighting circuit (i.e., the $J^{th}$ lighting circuit) and either changing the stored reference value for the target system parameter to account for the previously detected error, or stopping the comparison of the measured current value of the target system parameter with the stored reference value of the target system parameter.

In some embodiments it may be possible to determine the level of impairment in a selected lighting circuit (i.e., how many individual lights in the selected lighting circuit have failed). If this is the case, it may be possible to rotate between the N lighting circuits to select the lighting circuit that has the most functional lights still in it.

Acquiring a Light Identifier

Figure 11:
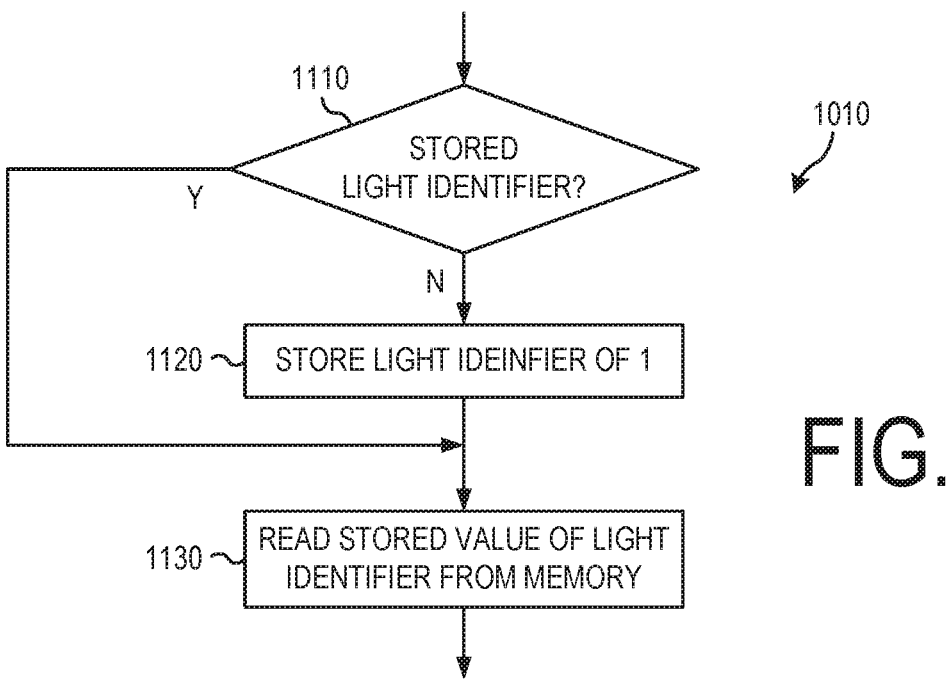
FIG. 11 is a flow chart describing the operation of acquiring a light identifier for a selected light of FIG. 10 according to disclosed embodiments.

FIG. 11 is a flow chart 1010 describing the operation of acquiring a light identifier for a selected light of FIG. 10 according to disclosed embodiments.

As shown in FIG. 11, the process 1010 begins by determining whether the lighting system has a stored light identifier for the lighting system (1110). The lighting system may already have a stored light identifier identifying a currently selected lighting circuit if the lighting system has been in operation previously but has been shut down for a time. For example, if the lighting system were on a vehicle, this may occur when the vehicle is restarted after previous operation.

If the lighting system does not have a stored lighting identifier that identifies a currently selected lighting circuit (e.g., the lighting system is being operated for the first time), then the lighting system will set the value of the light identifier to be 1 and will store that value in a nonvolatile memory (1020).

The lighting system will then read the stored light identifier for the selected lighting system from memory (1030). In some embodiments where the lighting system has newly stored a default value of 1 for the light identifier (i.e., selecting the first lighting circuit), the lighting system may simply read the light identifier from a volatile memory where it was just set. In other situations, the lighting system can read the stored light identifier from a nonvolatile memory.

If, however the lighting system determines that it does have a stored light identifier for the lighting system in memory (1010), then the lighting system will proceed to directly read the stored light identifier from the memory (generally a nonvolatile memory) (1030).

In this way, the lighting system can determine a light identifier even if there is no existing light identifier currently stored in memory.

Method of Self-Repairing a Lighting System—Fourth Disclosed Embodiment

Figure 12:
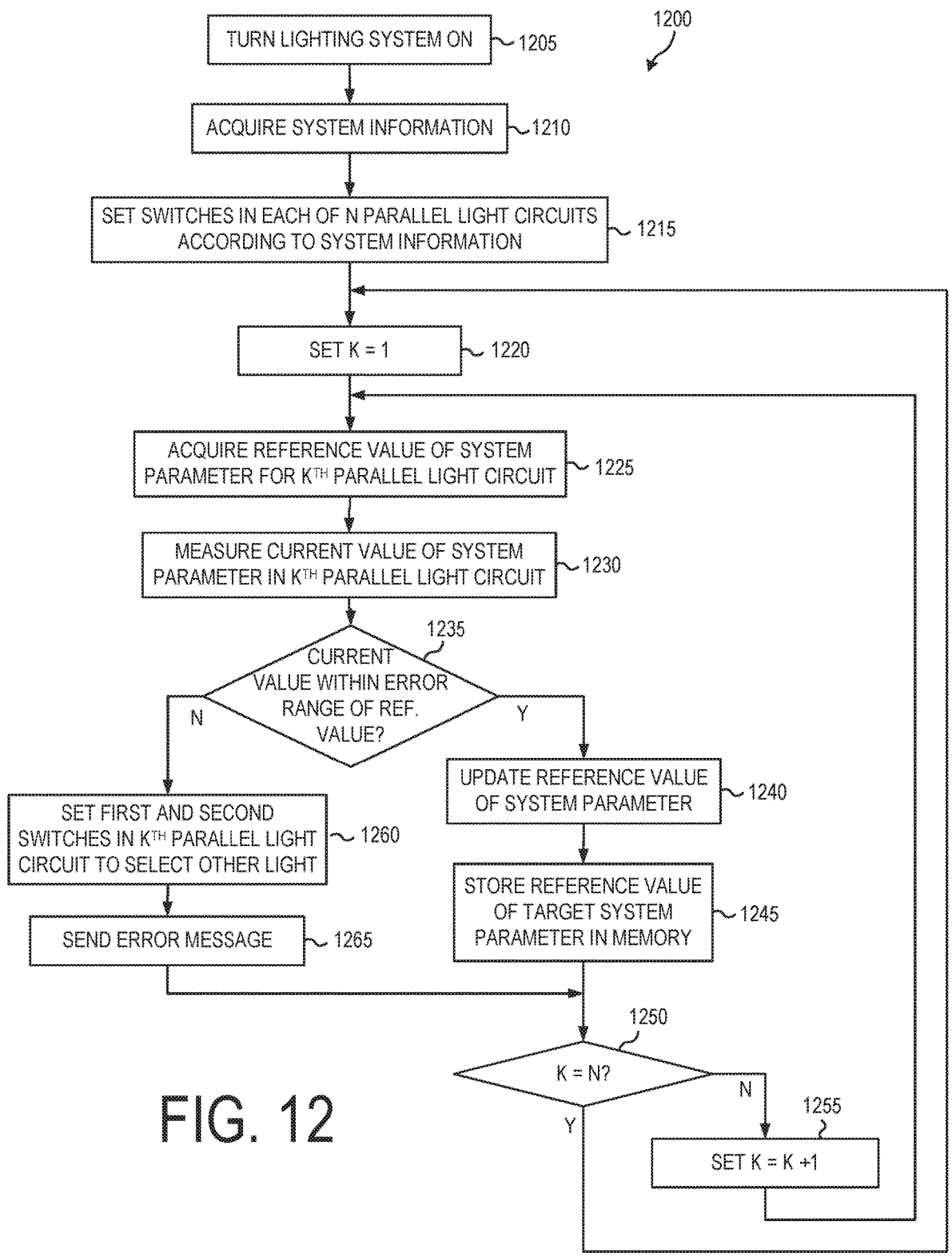
FIG. 12 is a flow chart describing another alternate operation of a self-repairing lighting system according to disclosed embodiments.

FIG. 12 is a flow chart describing another alternate operation 1200 of a self-repairing lighting system according to disclosed embodiments. In the self-repairing lighting system for this alternate operation 1200, the lighting system includes a plurality of parallel light circuits arranged in series between a power source and ground. (A value N will refer to the number of the plurality of lighting pairs.) Each of the parallel light circuits includes two lights that can be ultimately selected by manipulating switches within the parallel light circuit. In this way, each parallel light circuit can be individually controlled to select one of the two possible lights.

As shown in FIG. 12, the operation 1200 begins when the light system is turned on (1205).

The lighting system then acquires system information for the lighting system (1210). This system information includes which light in each of the plurality of parallel light circuits should be selected. As a default, the lighting system may select a first light in each of the plurality of parallel light circuits. This will occur when the lighting system is turned on for the first time. However, during later operation of the lighting system, the lighting system will reference stored system information that identifies the currently selected light for each of the plurality of parallel light circuits. For example, if the lighting system is in a vehicle, the lighting system it may be turned off when the vehicle is turned off and will be turned on again when the vehicle is again turned on.

Once the lighting system has acquired the system information, it sets switches in each of the plurality (N) of parallel light circuits according to the system information (1215). By setting the switches according to the acquired system information, the lighting system will cause power to be provided to one of the lights in each of the parallel light circuits and will prevent power from being provided to the other one of the lights in each of the parallel light circuits. Although this operation refers to the use of switches to select individual lights within each of the plurality of parallel light circuits, it is possible that alternate embodiments could employ different ways of selecting one of the lights in each of the plurality of parallel light circuits.

After the parallel light circuits have been controlled to select one of the lights in each of the parallel light circuits, the lighting system will set an index value K equal to 1 (1220). This index value K is used to identify a current parallel light circuit that is being analyzed.

The lighting system then acquires a reference circuit voltage for the $K^{th}$ parallel light circuit (1225). This reference circuit voltage is a voltage across the parallel light circuit, which corresponds to a voltage across a selected light within the parallel light circuit. This reference circuit voltage provides a reference from which it is possible to determine whether the currently selected parallel light circuit (i.e., the $K^{th}$ parallel light circuit) is operating properly. This operation is comparable to the similar operation 715 described above with respect to FIG. 7. The operations shown in FIG. 8 likewise describes the operation 1225.

As in previous embodiments, this reference value could be a default value, or it could be a stored value saved in a memory from a prior operation of the lighting system. In some embodiments, the lighting system can be operated for a period of time to allow the lighting system to adjust a stored value or a default value to account for a current operating status of the lighting system.

Once the reference value of the one or more system parameters are acquired, the lighting system then measures (i.e., detects) a current value of a circuit voltage for the selected parallel light circuit (i.e., the $K^{th}$ parallel light circuit) (1230).

The lighting system then compares the measured current value of the circuit voltage for the i.e., the $K^{th}$ parallel light circuit with the stored value of the circuit voltage for the i.e., the $K^{th}$ parallel light circuit to see if the current value is within an error range of the reference value of the circuit voltage (1235).

In some embodiments, the error range can be centered on the reference value such that the measured current value of the circuit voltage is within the error range if it is within a certain range above or below the reference value of the circuit voltage. In other embodiments the error range can be asymmetric such that the measured current value of the circuit voltage is within the error range if it is within a certain first range above the reference value of the circuit voltage or within a different second range below the reference value of the circuit voltage.

The error range is selected such that it provides an indication as to whether the selected parallel light circuit is operating properly. The circuit voltage across the parallel light circuit should remain relatively stable (plus or minus a certain amount) with respect to a reference circuit voltage if the selected light in the current parallel light circuit is operating properly. However, the selected light in the current parallel light circuit is malfunctioning, this will cause the measured circuit voltage across the selected parallel light circuit to spike in one direction such that the measured circuit voltage across the parallel light circuit will vary from a reference value of the circuit voltage by more than the error range.

If the measured current value of the circuit voltage of the $K^{th}$ parallel light circuit is within the error range of the reference value of the circuit voltage of the $K^{th}$ parallel light circuit, then the lighting system determines that the parallel light circuit is functioning properly. In this case the lighting system will update the reference value of the target circuit voltage of the $K^{th}$ parallel light circuit (1240). This updating is performed because over time and expected value of the circuit voltage may vary slightly as the parallel light circuit ages. Specifically, it would be expected that a so-called normal circuit voltage across the $K^{th}$ parallel light circuit will fluctuate over time as the selected parallel light circuit ages. In order to properly determine when the circuit voltage across the selected parallel light circuit should be considered abnormal, it is necessary to update the expected (i.e., stored) value for the circuit voltage.

The lighting system can update the reference value of the circuit voltage of the $K^{th}$ parallel light circuit in a number of ways. One alternative would be to save a number of measured values for the circuit voltage over time and either average those measured values or perform a weighted average on those measured values. For example, the lighting system could save the last 20 measured values for the circuit voltage of the $K^{th}$ parallel light circuit and use those 20 measured values to generate a new stored reference value for the circuit voltage. In the case when the lighting system is newly turned on, it can use a default or stored value for the circuit voltage and operate for a time without making any decisions as to whether an error has occurred (1235) until the required number of measured values have been acquired to update the stored value of the circuit voltage.

Once the reference value of the circuit voltage of the $K^{th}$ parallel light circuit is updated (1240), the updated reference value of the circuit voltage of the $K^{th}$ parallel light circuit is then stored in some kind of memory (1245). This newly stored value can then be used in the future when it is necessary to start operation afresh for the lighting system. Although the updated reference value is stored in a non-volatile memory, the lighting system (e.g., a controller) may retain that updated reference value in a volatile memory where it can be used for a future determination.

After the updated reference value of the circuit voltage is stored in memory (1245) the lighting system needs to move to monitor the next parallel light circuit. Therefore, the lighting system than determines whether K is equal to N (i.e., the total number of parallel light circuits in the lighting system) (1250). In other words, the lighting system determines whether the currently selected parallel light circuit is the last light circuit in the lighting system.

If the value of K is not equal to N (i.e., it is lower than N), the lighting system then sets K to be equal to K+1 (1255). This has the effect of moving the selected parallel light circuit to the next parallel light circuit in the lighting system. For example, if the third parallel light circuit was the currently selected light circuit, the lighting system would change K from a value of 3 to a value of 4. This would cause the lighting system to select the fourth parallel light circuit for analysis.

If the value of K is equal to N, the lighting system returns to setting K equal to 1 (1220). This has the effect of moving the selected parallel light circuit back to the first parallel light circuit.

After incrementing K (1255) or settings K equal to 1 (1220), the lighting system acquires a reference value for the circuit voltage for the newly selected $K^{th}$ parallel light circuit (1225), measures a current value of the circuit voltage for the newly selected $K^{th}$ parallel light circuit (1230), and continues the monitoring process. In this way, the lighting system can repeatedly step through each of the N parallel light circuits to determine whether an error has occurred in any of the plurality of parallel light circuits, and the reference values of the circuit voltages for each of the parallel light circuits can be continually updated.

If, however a measured current value of the circuit voltage for the $K^{th}$ parallel light circuit is determined to be outside of the error range of the reference value of the circuit voltage for the $K^{th}$ parallel light circuit (1235), then the lighting system determines that an error has occurred in the $K^{th}$ parallel light circuit (e.g., the selected light in the $K^{th}$ parallel light circuit has ceased to function properly), and steps will be taken to keep the lighting system functioning properly.

Specifically, the lighting system will set the switches in the $K^{th}$ parallel light circuit to select the other light in the $K^{th}$ parallel light circuit (1260). For example, if the selected light was the first light, the lighting system arrange the switches in the $K^{th}$ parallel light circuit such that power is provided to the second light and power is prevented from flowing to the defective first light.

The lighting system can then send an error message to a user indicating that an error has been found in the $K^{th}$ parallel light circuit (1265). This error message could include an audible alarm going off, an indicator light turning on, a message being sent to a user via email, text, or any other messaging system, or any similar indication that would alert a user that some or all of the first lighting circuit is not functioning properly. In some embodiments, the error message could include multiple error messages in different formats.

Although the sending of an error message may be omitted in some embodiments, it can provide valuable feedback to a user indicating that the lighting system should be serviced or replaced.

The lighting system then proceeds to determine if K is equal to N (1250) and adjusts the value of K accordingly, proceeding with monitoring the next parallel light circuit.

In order to prevent a continual loop of rotating between the two lights in a given parallel light circuit, the lighting system should include some means of indicating that a failure has occurred for one of the lights in a given parallel light circuit and either changing the stored reference value for the target system parameter to account for the previously detected error, or stopping the comparison of the measured current value of the circuit voltage for the $K^{th}$ parallel light circuit with the stored reference value of the circuit voltage for the $K^{th}$ parallel light circuit.

Although in the above embodiment, each of the parallel light circuits includes two lights that can be selected by manipulating switches within the parallel light circuit, alternate embodiments can use parallel light circuits that include three or more selectable lights. In this way, each parallel light circuit can be individually controlled to select one of three or more possible lights. This can allow the lighting system greater flexibility by allowing more than one light in each parallel light circuit to fail before the entire lighting system must suffer a lighting failure.

Acquiring System Information

Figure 13:
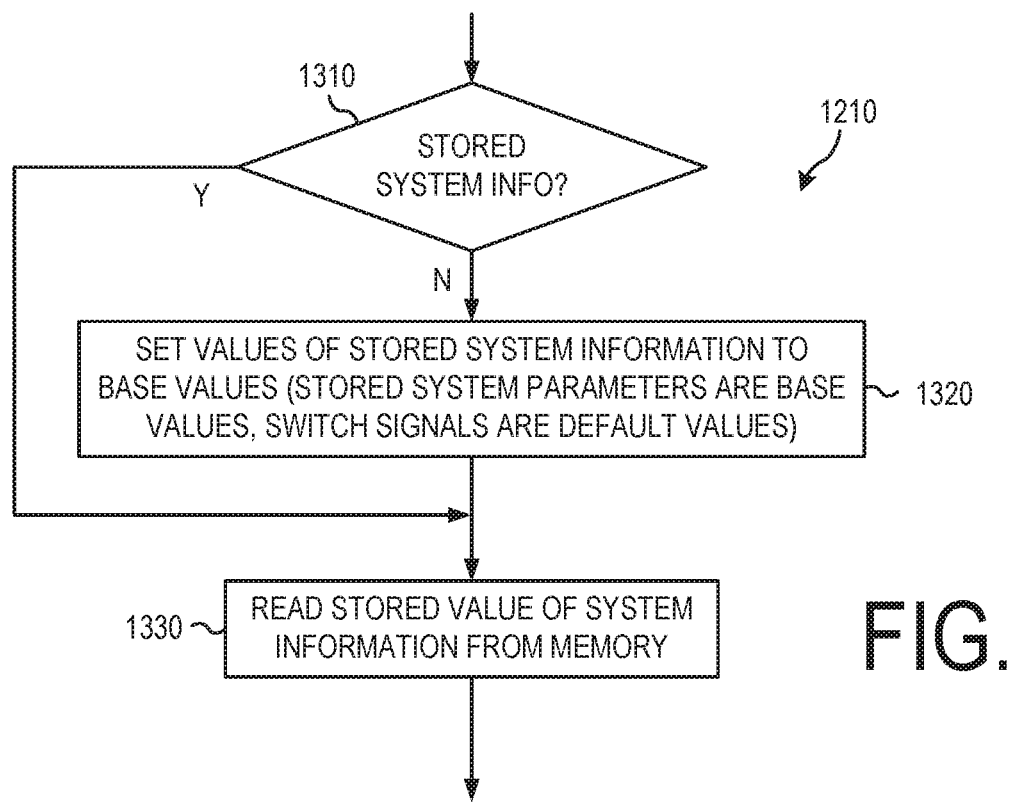
FIG. 13 is a flow chart describing the operation of acquiring system information of FIG. 12 according to disclosed embodiments.

FIG. 13 is a flow chart describing the operation 1210 of acquiring system information of FIG. 12 according to disclosed embodiments.

As shown in FIG. 13, the operation 1210 begins by determining whether the lighting system has a stored system information for the lighting system (1210). As noted above, this system information can include which light is selected for each of a plurality of lighting pairs in the lighting system. The lighting system may already have a stored system information if the lighting system has been in operation previously but has been shut down for a time. For example, if the lighting system were on a vehicle, this may occur when the vehicle is restarted after previous operation.

If the lighting system does not have a stored system information (e.g., the lighting system is being operated for the first time), then the lighting system will set the lighting information to a set of base values and will store those base values in a nonvolatile memory (1220). In one embodiment, the base values for the stored system information can indicate that for each of the plurality of lighting pairs, a first light among the pair of lights is selected.

The lighting system will then read the stored system information from memory (1230). In some embodiments where the lighting system has newly stored the system information as default values, the lighting system may simply read the system information from a volatile memory where it was just set. In other situations, the lighting system can read the stored system information from a nonvolatile memory.

If, however the lighting system determines that it does have a stored system information for the lighting system in memory (1210), then the lighting system will proceed to directly read the stored system information from the memory (generally a nonvolatile memory) (1230).

In this way, the lighting system can determine the proper system information even if there is no existing system information currently stored in memory.

Method of Self-Repairing a Lighting System—Alternate Embodiments

Although several specific embodiments of a method of self-preparing a lighting system are disclosed above, these are by way of example only. Alternate embodiments could combine various aspects of each of the above disclosed embodiments.

CONCLUSION

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A self-repairing lighting system, comprising:
    a power line connected to a power node;
    a ground line connected to a ground node;
    a first lighting circuit arranged between the power node and the ground node, the first lighting circuit including
        a plurality of first light-emitting diodes arranged in series with each other, and
        a first switch arranged in series with the plurality of first light-emitting diodes;
    a second lighting circuit arranged between the power node and the ground node, the second lighting circuit including
        a plurality of second light-emitting diodes arranged in series with each other, and
        a second switch arranged in series with the plurality of second light-emitting diodes;
    a detector configured to detect an operating parameter of the self-repairing lighting system;
    a local controller configured to operate the first and second switches based on the operating parameter,
    wherein
    the operating parameter is one of a voltage drop on one of the power line, the ground line, the first lighting circuit, or the second lighting circuit, or a current passing through one of the power line, the ground line, the first lighting circuit, or the second lighting circuit,
    the first lighting circuit is arranged in parallel with the second lighting circuit,
    the first switch has a first position that allows current to flow through the first lighting circuit from the power node to the ground node and a second position that prevents current from flowing through the first lighting circuit from the power node to the ground node,
    the second switch has a first position that allows current to flow through the second lighting circuit from the power node to the ground node and a second position that prevents current from flowing through the second lighting circuit from the power node to the ground node,
    the detector further comprises a sense resistor formed either on the power line between the power node and a power source or on the ground line between the ground node and a ground voltage, and
    the local controller is further configured to determine a voltage drop across the sense resistor based on a first voltage at a first terminal of the sense resistor and a second voltage at a second terminal of the sense resistor.

2. The self-repairing lighting system of claim 1, wherein the detector further comprises:
    a current detector formed either on the power line between the power node and a power source or on the ground line between the ground node and a ground voltage, the current detector operative to detect a current flowing from the power source to the ground.

3. The self-repairing lighting system of claim 1, further comprising:
    a third lighting circuit arranged between the power node and the ground node, the third lighting circuit including
        a plurality of third light-emitting diodes arranged in series with each other; and
        a third switch arranged in series with the plurality of third light-emitting diodes,
    wherein
    the local controller is further configured to operate the third switch based on the operating parameter.

4. The self-repairing lighting system of claim 1, wherein the local controller is further configured to
    close the first switch and open the second switch when the operating parameter is determined to be within an error range of values; and
    open the first switch and close the second switch when the operating parameter is determined to be outside of the error range of values.

5. The self-repairing lighting system of claim 4, wherein the local controller is further configured to send an error message to a remote controller when the operating parameter is determined to be outside of the error range of values.

6. The self-repairing lighting system of claim 1, wherein the local controller includes a memory configured to store the detected operating parameter related to the self-repairing lighting system.

7. A self-repairing lighting system, comprising:
a power line connected to a power node;
a ground line connected to a ground node;
a plurality of light circuits arranged in series between the power node and the ground node, each light circuit including
   a first light-emitting diode and a first switch arranged in series between an input node of the light circuit and an output node of the light circuit,
   a second light-emitting diode and a second switch arranged in series between the input node and the output node, the second light-emitting diode and the second switch being in parallel with the first light-emitting diode and the first switch, and
   a voltage detector configured to detect a voltage drop across the first light-emitting diode and generate a voltage signal; and
a local controller configured to operate the first and second switches in each of the light circuits based on the plurality of voltage drops in the plurality of light circuits,
wherein
the first switch has a first position that allows current to flow through the first lighting circuit from the power node to the ground node and a second position that prevents current from flowing through the first lighting circuit from the power node to the ground node,
the second switch has a first position that allows current to flow through the second lighting circuit from the power node to the ground node and a second position that prevents current from flowing through the second lighting circuit from the power node to the ground node, and
the voltage detector is further configured to determine a voltage drop across the first light-emitting diode based on a first voltage at a first terminal of the first light-emitting diode and a second voltage at a second terminal of the first light-emitting diode.

8. The self-repairing lighting system of claim 7, wherein the voltage detector in each light circuit further comprises:
a first voltage detector configured to detect a first voltage at a first terminal of the first light-emitting diode, and
a second voltage detector configured to detect a second voltage at a second terminal of the first light-emitting diode,
wherein
the local controller is further configured to determine a voltage drop across the first light based on the first voltage and the second voltage.

9. The self-repairing lighting system of claim 7, wherein each light circuit further comprises a third light-emitting diode and a third switch arranged in series between the input node and the output node, the third light-emitting diode and the third switch being in parallel with both the first light-emitting diode and the first switch, and the second light-emitting diode and the second switch, and the local controller is further configured to operate the third switch in each of the light circuits based on the plurality of voltage drops in the plurality of light circuits.

10. The self-repairing lighting system of claim 7, wherein the local controller includes a memory configured to store system parameters related to the self-repairing lighting system.

11. The self-repairing lighting system of claim 7, wherein the local controller is further configured to
send an error message to a remote controller when the operating parameter is determined to be outside of an error range of values.

12. A method of operating a self-repairing lighting system having a first set of light-emitting diodes arranged on a first line in parallel with a second set of light-emitting diodes on a second line, comprising:
setting a first switch to be closed such that power is provided on the first line to the first set of light-emitting diodes from a power line upon turning the self-repairing lighting system on;
setting a second switch to be open such that power is not provided on the second line to the second set of light-emitting diodes from the power line upon turning the self-repairing lighting system on;
measuring a first operating parameter of the self-repairing lighting system;
determining whether the measured first operating parameter is within an error range of values;
setting the second switch to be closed such that power is provided on the second line to the second set of lights from the power line when the measured first operating parameter is determined to be outside of the error range of values; and
setting the first switch to be open such that power is not provided on the second line to the first set of lights from the power line when the measured first operating parameter is determined to be outside of the error range of values,
wherein
the first operating parameter is one of a voltage drop over at least a portion of the power line, the ground line, the first lighting circuit, or the second lighting circuit, or a current passing through one of the power line, the ground line, the first lighting circuit, or the second lighting circuit, and
wherein the operation of measuring the operating parameter further includes
   measuring a first voltage at a first node of a sense resistor formed in one of the power line, the ground line, the first lighting circuit, or the second lighting circuit,
   measuring a second voltage at a second node of the sense resistor, and
   determining one of the voltage drop over at least the portion of the power line, the ground line, the first lighting circuit, or the second lighting circuit, or the current passing through one of the power line, the ground line, the first lighting circuit, or the second lighting circuit based on the first voltage and the second voltage.

13. The method of operating the self-repairing lighting system of claim 12, further comprising:
sending an error message to a remote controller when the first operating parameter is determined to be outside of the error range of values.

14. The method of operating the self-repairing lighting system of claim 12, further comprising:
defining the error range of values as a base range of values upon turning the self-repairing lighting system on;
determining a revised range of values based on the error range of values and the measured operating parameter;
setting the error range of values to be equal to the revised range of values; and
repeating the operations of determining a revised range of values and setting the error range of values to be equal to the revised range of values each time the operating parameter is measured.

15. The method of operating the self-repairing lighting system of claim 14, further comprising:
storing a plurality of measured operating parameters over time; and
determining the revised range of values based on the error range of values and the plurality of measured operating parameters.

16. The method of operating the self-repairing lighting system of claim 12, wherein
the operation of measuring the first operating parameter is repeated.

17. The method of operating the self-repairing lighting system of claim 12, further comprising:
determining whether the measured operating parameter is within a maintenance range of values, the maintenance range of values being within the error range of values; and
sending a maintenance message to a remote controller when the operating parameter is determined to be outside of the maintenance range of values but within the error range of values.

18. The method of operating the self-repairing lighting system of claim 12, further comprising:
measuring second through $N^{th}$ operating parameters of the self-repairing lighting system, the first though $N^{th}$ operating parameters being voltage drops over first though $N^{th}$ light-emitting diodes, respectively, in the first lighting circuit;
determining whether the any of the measured first through $N^{th}$ operating parameters are within an error range of values;
setting the second switch to be closed such that power is provided to the second set of lights from the power line when any of the measured first though $N^{th}$ operating parameters are determined to be outside of the error range of values; and
setting the first switch to be open such that power is not provided to the first set of light-emitting diodes from the power line when any of the measured first though $N^{th}$ operating parameters though $N^{th}$ determined to be outside of the error range of values,
wherein
N is an integer greater than 1.

19. A method of operating a self-repairing lighting system having first through Nth sets of light-emitting diodes, each arranged in parallel, comprising:
setting a first switch to be closed such that power is provided to the first set of light-emitting diodes from a power line upon turning the self-repairing lighting system on;
setting second through $N^{th}$ switches to be open such that power is not provided to the second through $N^{th}$ sets of light-emitting diodes from the power line upon turning the self-repairing lighting system on;
setting a lighting counter J equal to 1;
measuring an operating parameter of the self-repairing lighting system;
determining whether the measured operating parameter is within an error range of values;
incrementing the lighting counter J if the measured operating parameter is outside the error range of values;
setting the $J^{th}$ switch to be closed such that power is provided to the second set of lights from the power line when the measured operating parameter is determined to be outside of the error range of values; and
setting the first through $(J-1)^{th}$ switches and the $(J+1)^{th}$ to $N^{th}$ switches to be open such that power is not provided to the first through $(J-1)^{th}$ sets of light-emitting diodes and the $(J+1)^{th}$ to $N^{th}$ sets of light-emitting diodes from the power line when the measured operating parameter is determined to be outside of the error range of values,
wherein
N is an integer greater than 2,
the operating parameter is one of a voltage drop over at least a portion of the power line, the ground line, one of the first through $N^{th}$ lighting circuits, or a current passing through one of the power line, the ground line, or the one of the first through $N^{th}$ lighting circuits,
the operations of measuring an operating parameter, determining whether the measured operating parameter is within an error range of values, incrementing the lighting counter J if the measured operating parameter is outside the error range of values, setting the $J^{th}$ switch to be closed when the measured operating parameter is determined to be outside of the error range of values, and setting the first through $(J-1)^{th}$ switches and the $(J+1)^{th}$ to $N^{th}$ switches to be open when the measured operating parameter is determined to be outside of the error range of values are repeated throughout operation of a lighting system, and
wherein the operation of measuring the operating parameter further includes
measuring a first voltage at a first node of a sense resistor formed in one of the power line, the ground line, or the one of the first through $N^{th}$ lighting circuits,
measuring a second voltage at a second node of the sense resistor, and
determining one of the voltage drop over at least the portion of the power line, the ground line, or the one of the first through $N^{th}$ lighting circuits, or the current passing through one of the power line, the ground line, or the one of the first through $N^{th}$ lighting circuits based on the first voltage and the second voltage.

20. The method of operating the self-repairing lighting system of claim 19, further comprising:
sending a maintenance warning message to a remote controller when it is determined that the measured operating parameter is outside the error range of values, and (J<N).

21. The method of operating the self-repairing lighting system of claim 19, further comprising:
sending an error message to a remote controller when it is determined that the measured operating parameter is outside the error range of values, and (J=N).

22. The method of operating the self-repairing lighting system of claim 19, further comprising:
defining the error range of values as a base range of values upon turning the self-repairing lighting system on;
determining a revised range of values based on the error range of values and the measured operating parameter;

setting the error range of values to be equal to the revised range of values; and repeating the operations of determining a revised range of values and setting the error range of values to be equal to the revised range of values each time the operating parameter is measured.

23. The method of operating the self-repairing lighting system of claim 19, further comprising:

storing a plurality of measured operating parameters over time; and determining the revised range of values based on the error range of values and the plurality of measured operating parameters.

24. The method of operating the self-repairing lighting system of claim 12, further comprising:

updating a reference value used to set the error range of values when it is determined that the measured first operating parameter is within the error range of values; and storing the updated reference values in a system memory.

* * * * *